US011669811B2

United States Patent
Ramasamy et al.

(10) Patent No.: US 11,669,811 B2
(45) Date of Patent: Jun. 6, 2023

(54) BLOCKCHAIN-BASED DIGITAL TOKEN UTILIZATION

(71) Applicant: Bank of America Corporation, Charlotte, NC (US)

(72) Inventors: Suki Ramasamy, Chennai (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 510 days.

(21) Appl. No.: 16/584,442

(22) Filed: Sep. 26, 2019

(65) Prior Publication Data

US 2020/0027066 A1   Jan. 23, 2020

Related U.S. Application Data

(63) Continuation of application No. 15/967,064, filed on Apr. 30, 2018, now abandoned.

(51) Int. Cl.
| | |
|---|---|
| G06Q 20/06 | (2012.01) |
| G06Q 20/36 | (2012.01) |
| G06Q 20/38 | (2012.01) |
| H04L 9/32 | (2006.01) |
| H04L 9/06 | (2006.01) |
| H04L 67/104 | (2022.01) |

(Continued)

(52) U.S. Cl.
CPC ......... *G06Q 20/06* (2013.01); *G06Q 20/3674* (2013.01); *G06Q 20/3825* (2013.01); *H04L 9/0637* (2013.01); *H04L 9/3247* (2013.01); *H04L 63/12* (2013.01); *H04L 67/104* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 8,447,667 B1 * | 5/2013 | Dinamani | ............ | G06Q 40/025 705/31 |
| 8,880,425 B2 * | 11/2014 | Loevenguth | ............ | G06Q 40/00 705/17 |

(Continued)

FOREIGN PATENT DOCUMENTS

| | | | | | |
|---|---|---|---|---|---|
| WO | WO-2018127923 A1 * | 7/2018 | ............. | G06F 21/64 |
| WO | WO-2018145024 A1 * | 8/2018 | ............. | G06F 16/27 |

OTHER PUBLICATIONS

Robert Norvill et al., Automated labeling of unknown contracts in Ethereum, IEEE, 2017, pp. 6, visited Sep. 11, 2021.

(Continued)

*Primary Examiner* — Neha Patel
*Assistant Examiner* — Jahed Ali
(74) *Attorney, Agent, or Firm* — Banner & Witcoff, Ltd.

(57) ABSTRACT

Methods, systems, and apparatuses for blockchain-based digital token utilization are described herein. Data corresponding to digital tokens may be stored on a blockchain associated with a decentralized peer-to-peer (P2P) network. Smart contracts for collecting digital tokens in exchange for service provider tokens may be deployed to the blockchain. Smart contracts for distributing digital tokens based on credit tokens may be deployed to the blockchain. Through execution of the smart contracts, digital tokens may be utilized by users in various ways.

17 Claims, 13 Drawing Sheets

(51) Int. Cl.
*H04L 9/40* (2022.01)
*H04L 9/00* (2022.01)

(56) References Cited

U.S. PATENT DOCUMENTS

| | | | | |
|---|---|---|---|---|
| 9,397,985 | B1 | 7/2016 | Seger, II et al. | |
| 9,635,000 | B1 | 4/2017 | Muftic | |
| 9,704,143 | B2 | 7/2017 | Walker et al. | |
| 9,794,074 | B2 | 10/2017 | Toll et al. | |
| 9,818,092 | B2 | 11/2017 | Pennanen | |
| 9,849,364 | B2 | 12/2017 | Tran et al. | |
| 10,250,395 | B1* | 4/2019 | Borne-Pons | H04L 9/3247 |
| 2003/0225692 | A1* | 12/2003 | Bosch | G06Q 20/108 705/42 |
| 2005/0102228 | A1* | 5/2005 | Srinivasan | G06Q 40/02 705/39 |
| 2005/0279824 | A1* | 12/2005 | Anderson | G06Q 30/06 235/380 |
| 2008/0091580 | A1* | 4/2008 | Kremen | G06Q 40/02 705/35 |
| 2008/0091589 | A1* | 4/2008 | Kremen | G06Q 50/06 705/38 |
| 2008/0243569 | A1* | 10/2008 | Hadden | G06Q 40/02 705/38 |
| 2009/0248574 | A1* | 10/2009 | Leung | G06Q 40/02 705/39 |
| 2011/0282780 | A1* | 11/2011 | French | G06Q 20/10 705/39 |
| 2013/0317984 | A1 | 11/2013 | O'Leary et al. | |
| 2014/0143757 | A1* | 5/2014 | Buxbaum | G06F 11/3082 717/124 |
| 2015/0012409 | A1* | 1/2015 | Toft | G06Q 40/04 705/37 |
| 2016/0260171 | A1 | 9/2016 | Ford et al. | |
| 2016/0335628 | A1 | 11/2016 | Weigold | |
| 2017/0024813 | A1 | 1/2017 | Crouspeyre et al. | |
| 2017/0140408 | A1 | 5/2017 | Wuehler | |
| 2017/0206532 | A1 | 7/2017 | Choi | |
| 2017/0236094 | A1 | 8/2017 | Shah | |
| 2017/0279774 | A1 | 9/2017 | Booz et al. | |
| 2017/0353309 | A1* | 12/2017 | Gray | G06F 21/51 |
| 2018/0091316 | A1* | 3/2018 | Stradling | G06Q 40/04 |
| 2018/0150910 | A1* | 5/2018 | Grech | G06Q 40/025 |
| 2018/0204190 | A1* | 7/2018 | Moy | G06Q 20/108 |
| 2018/0218176 | A1* | 8/2018 | Voorhees | H04L 9/3213 |
| 2018/0268382 | A1* | 9/2018 | Wasserman | G06Q 20/0655 |
| 2018/0293553 | A1* | 10/2018 | Dembo | G06Q 20/0655 |
| 2018/0330343 | A1* | 11/2018 | Gray | G06Q 20/3829 |
| 2019/0013932 | A1* | 1/2019 | Maino | G06F 16/27 |
| 2019/0108362 | A1* | 4/2019 | Miller | G06F 21/6245 |
| 2019/0108542 | A1* | 4/2019 | Durvasula | G06Q 20/3829 |
| 2019/0289019 | A1* | 9/2019 | Thekadath | H04L 9/3239 |
| 2019/0295164 | A1* | 9/2019 | Hoshino | G06Q 40/025 |
| 2019/0303939 | A1* | 10/2019 | Kurian | G06Q 20/3224 |
| 2019/0333030 | A1* | 10/2019 | Ramasamy | H04L 9/3239 |
| 2020/0134206 | A1* | 4/2020 | Thekadath | H04L 9/3247 |
| 2020/0294140 | A1* | 9/2020 | Yang | G06Q 20/405 |
| 2020/0320529 | A1* | 10/2020 | Lyadvinsky | H04L 9/3252 |
| 2021/0383469 | A1* | 12/2021 | Chou | G06Q 40/04 |

OTHER PUBLICATIONS

Satoshi Nakamoto, "Bitcoin: A Peer-to-Peer Electronic Cash System," pp. 1-9, https://bitcoin.org/bitcoin.pdf (accessed Apr. 30, 2018).

Wikipedia contributors, "A Next-Generation Smart Contract and Decentralized Application Platform," Wikipedia, The Free Encyclopedia, pp. 1-26, https://github.com/ethereum/wiki/wiki/White-Paper (accessesd Apr. 30, 2018).

Curtis Silver, "Token Union Is The Decentralized Cryptocurrency Savings Account That Rewards Patience," Forbes, pp. 1-5, https://www.forbes.com/sites/curtissilver/2017/11/03/tokenbnk-is-the-decentralized-cryptocurrency-savings-account-that-rewards-patience/#7e401d6c5f09 (accessed Apr. 30, 2018).

Token Union contributors,"Get Rewarded for Holding Crypto," Token Union, pp. 1-6, http://tokenunion.io/ (accessed Apr. 30, 2018).

Keno Leon, "Making a time savings contract in Ethereum," Medium, pp. 1-8, https:://medium.com/@k3no/making-a-time-savings-contract-in-ethereum-b89cacfdfe4e (accessed Apr. 30, 2018).

BitcoinMagazine contributors, "Options for Borrowing and Lending With Cryptocurrency Are on the Rise," BitcoinMagazine, pp. 1-5, https://bitcoinmagazine.com/articles/options-borrowing-and-lending-cryptocurrency-are-rise/ (accessed Apr. 30, 2018).

Shayne Coplan, "TokenUnion: Reinventing Savings via Cryptoeconomically Incentivized Holding," DocSend, pp. 1-10, https://docsend.com/view/hj4tdrk (accessed Apr. 30, 2018).

ETHLend contributors, "Top 10 digital Tokens to Use in EthLend For Getting an Ethereum Loan—Is Your Token Portfolio Worth to Pledge:," ETHLend, pp. 1-10, https://blog.ethlend.io/top-10-digital-tokens-to-use-in-ethlend-for-getting-an-ethereum-loan-is-your-token-portfolio-49da3dab5140 (accessed Apr. 30, 2018).

ETHLend contributors, "Decentralized Applications and Lending on the Blockchain," The Meduim, pp. 1-4, https://medium.com/@ethlend1/decentralized-applications-and-lending-on-the-blockchain-5bc415908042 (accessed Apr. 30, 2018).

ETHLend contributors, "ETHLend.io White Paper—Democratizing Lending," ETHLend, pp. 1-61, https://github.com/ETHLend/Documentation/blob/master/ETHLendWhitePaper.md#ethlendio-white-paper-democratizing-lending (accessed Apr. 30, 2018).

* cited by examiner

BLOCKCHAIN-BASED DIGITAL TOKEN UTILIZATION

CROSS REFERENCE TO RELATED APPLICATIONS

This application is a continuation of and claims priority to patent application Ser. No. 15/967,064 entitled "Blockchain-Based Digital Token Utilization" and filed on Apr. 30, 2018, which is incorporated by reference in its entirety.

FIELD

Aspects described herein generally relate to decentralized peer-to-peer (P2P) computer systems specialized for the purpose of managing a blockchain. In particular, one or more aspects of the disclosure relate to utilizing digital tokens on or using a blockchain.

BACKGROUND

Centralized computing systems may be used to manage information related to digital tokens. Centralized computing systems may receive digital tokens from a plurality of entities, and may control the distribution of the digital tokens to users of the centralized system in return for interest provided by the users. But centralized computing systems may constitute a single point of failure, which may be undesirable from a reliability standpoint and from a security standpoint.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards utilizing digital tokens on a blockchain.

In accordance with one or more embodiments, a computing platform configured to operate in a decentralized peer-to-peer (P2P) network and including one or more processors and memory storing at least a portion of a blockchain of the decentralized P2P network may receive, from a first user computing device, a first registration request for registering a collection smart contract. The computing platform may register the collection smart contract by adding a first new block to the blockchain. The first new block may comprise the collection smart contract. The computing platform may receive, from the first user computing device, a first event message indicating a first amount of service provider tokens, an identifier of the collection smart contract, and a digital signature associated with the first user computing device. The computing platform may verify an authenticity of the first event message based on the digital signature associated with the first user computing device. The computing platform may, in response to receiving the first event message, execute the collection smart contract, which may cause the computing platform to transfer, from a service provider token holder associated with the first user computing device and to the collection smart contract, the first amount of the service provider tokens. The computing platform may receive, from a second user computing device, a second event message indicating a first amount of digital tokens, an identifier of the collection smart contract, and a digital signature associated with the second user computing device. The computing platform may verify an authenticity of the second event message based on the digital signature associated with the second user computing device. The computing platform may, in response to receiving the second event message, execute the collection smart contract, which may cause the computing platform to transfer, from a digital token holder associated with the second user computing device and to the collection smart contract, the first amount of the digital tokens. Execution of the collection smart contract may cause the computing platform to determine, based on the first amount of the digital tokens and an exchange rate between the digital tokens and the service provider tokens, a second amount of the service provider tokens. Execution of the collection smart contract may cause the computing platform to transfer, from the collection smart contract and to a service provider token holder associated with the second user computing device, the second amount of the service provider tokens.

In some embodiments, the computing platform may receive, from the second user computing device, a third event message indicating a third amount of the service provider tokens and an identifier of the collection smart contract. The computing platform may, in response to receiving the third event message, execute the collection smart contract, which may cause the computing platform to transfer, from the service provider token holder associated with the second user computing device and to the collection smart contract, the third amount of the service provider tokens. Execution of the collection smart contract may cause the computing platform to determine, based on an appreciation rate associated with the digital tokens and a time period between receiving the second event message and receiving the third event message, an updated exchange rate between the digital tokens and the service provider tokens. Execution of the collection smart contract may cause the computing platform to determine, based on the third amount of the service provider tokens and the updated exchange rate between the digital tokens and the service provider tokens, a second amount of the digital tokens. Execution of the collection smart contract may cause the computing platform to transfer, from the collection smart contract and to the digital token holder associated with the second user computing device, the second amount of the digital tokens.

In some embodiments, the computing platform may receive, from the first user computing device, a second registration request for registering a distribution smart contract. The computing platform may register the distribution smart contract by adding a second new block to the blockchain. The second new block may comprise the distribution smart contract. The computing platform may receive, from the first user computing device, a fourth event message indicating a third amount of the digital tokens and an identifier of the distribution smart contract. The computing platform may, in response to receiving the fourth event message, execute the distribution smart contract, which may cause the computing platform to transfer, from a digital token holder associated with the first user computing device and to the distribution smart contract, the third amount of the digital tokens. The computing platform may receive, from a third user computing device, a fifth event message indicating a first amount of credit tokens and an identifier of the distribution smart contract. The computing platform may, in response to receiving the fifth event message, execute the distribution smart contract, which may cause the computing platform to transfer, from a credit token holder associated with the third user computing device and to the distribution smart contract, the first amount of the credit tokens. Execution of the distribution smart contract may cause the computing platform to determine, based on the first amount of the credit tokens and an exchange rate between the digital tokens and the credit tokens, a fourth amount of the digital tokens. Execution of the distribution smart contract may cause the computing platform to transfer, from the distribution smart contract and to a digital token holder associated with the third user computing device, the fourth amount of the digital tokens.

In some embodiments, the computing platform may receive, from the third user computing device, a sixth event message indicating a fifth amount of the digital tokens and an identifier of the distribution smart contract. The computing platform may, in response to receiving the sixth event message, execute the distribution smart contract, which may cause the computing platform to determine, based on the fourth amount of the digital tokens, a time period between receiving the fifth event message and receiving the sixth event message, and an interest rate associated with the digital tokens, an expected amount of the digital tokens. Execution of the distribution smart contract may cause the computing platform to, in response to determining that the fifth amount of the digital tokens corresponds to the expected amount of the digital tokens, transfer, from the distribution smart contract and to the credit token holder associated with the third user computing device, the first amount of the credit tokens and an additional amount of the credit tokens. Execution of the distribution smart contract may cause the computing platform to transfer, from the digital token holder associated with the third user computing device and to the distribution smart contract, the fifth amount of the digital tokens.

In some embodiments, the computing platform may, in response to determining that the fifth amount of the digital tokens does not correspond to the expected amount of the digital tokens, transfer, from the distribution smart contract and to a credit token holder associated with the first user computing device, the first amount of the credit tokens. In some embodiments, the computing platform may, in response to receiving the second event message, transfer, from the collection smart contract and to the distribution smart contract, a portion of the first amount of the digital tokens. In some embodiments, the computing platform may determine, based on a credit score associated with the third user computing device, a second amount of the credit tokens. The computing platform may assign the second amount of the credit tokens to the credit token holder associated with the third user computing device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
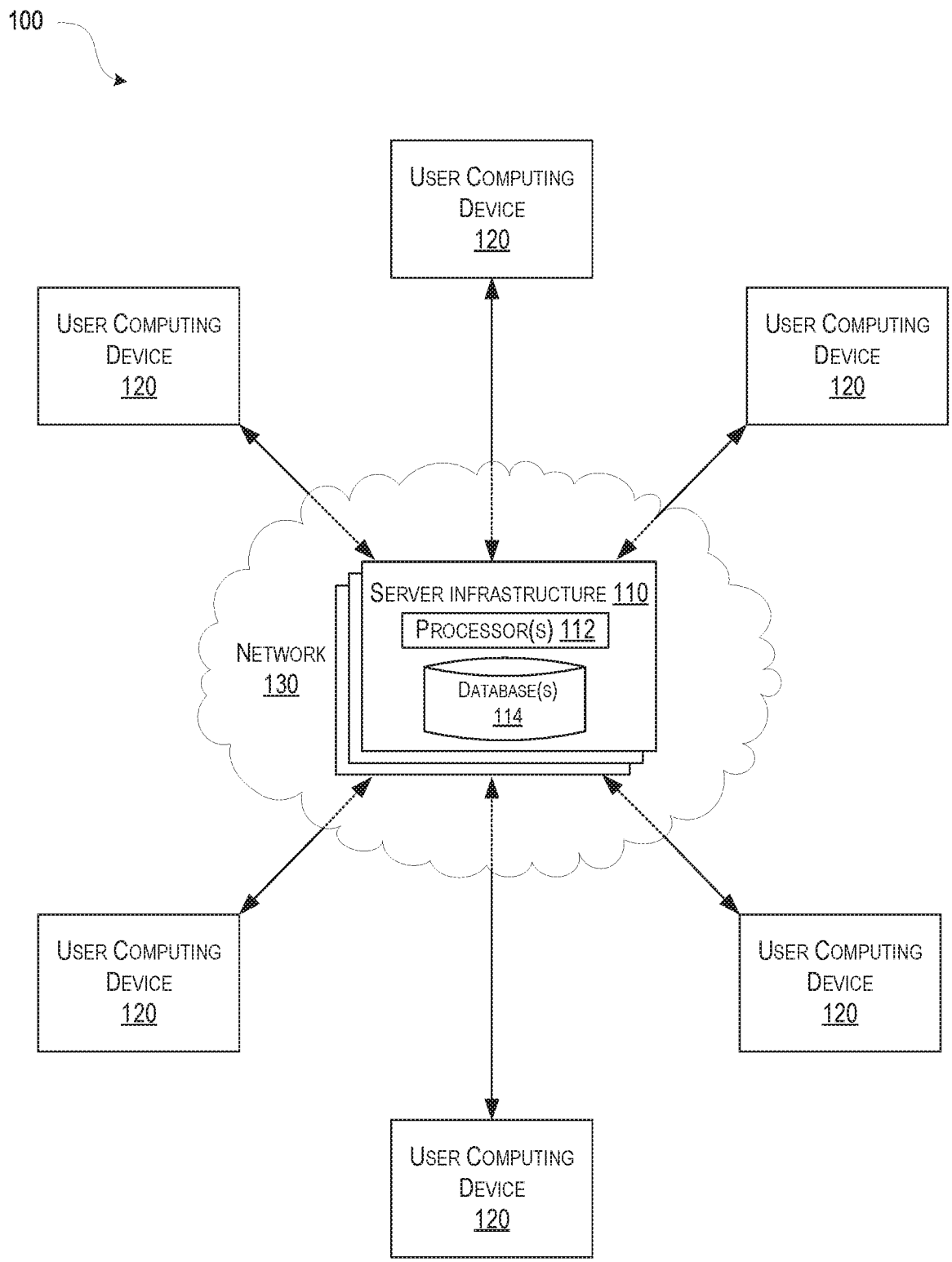
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods, systems, and apparatuses for blockchain-based digital token utilization. Data corresponding to digital tokens may be stored on a blockchain associated with a decentralized peer-to-peer (P2P) network. Smart contracts for collecting digital tokens in exchange for service provider tokens may be deployed to the blockchain. Smart contracts for distributing digital tokens based on credit tokens may be deployed to the blockchain. Through execution of the smart contracts, digital tokens may be utilized by users in various ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
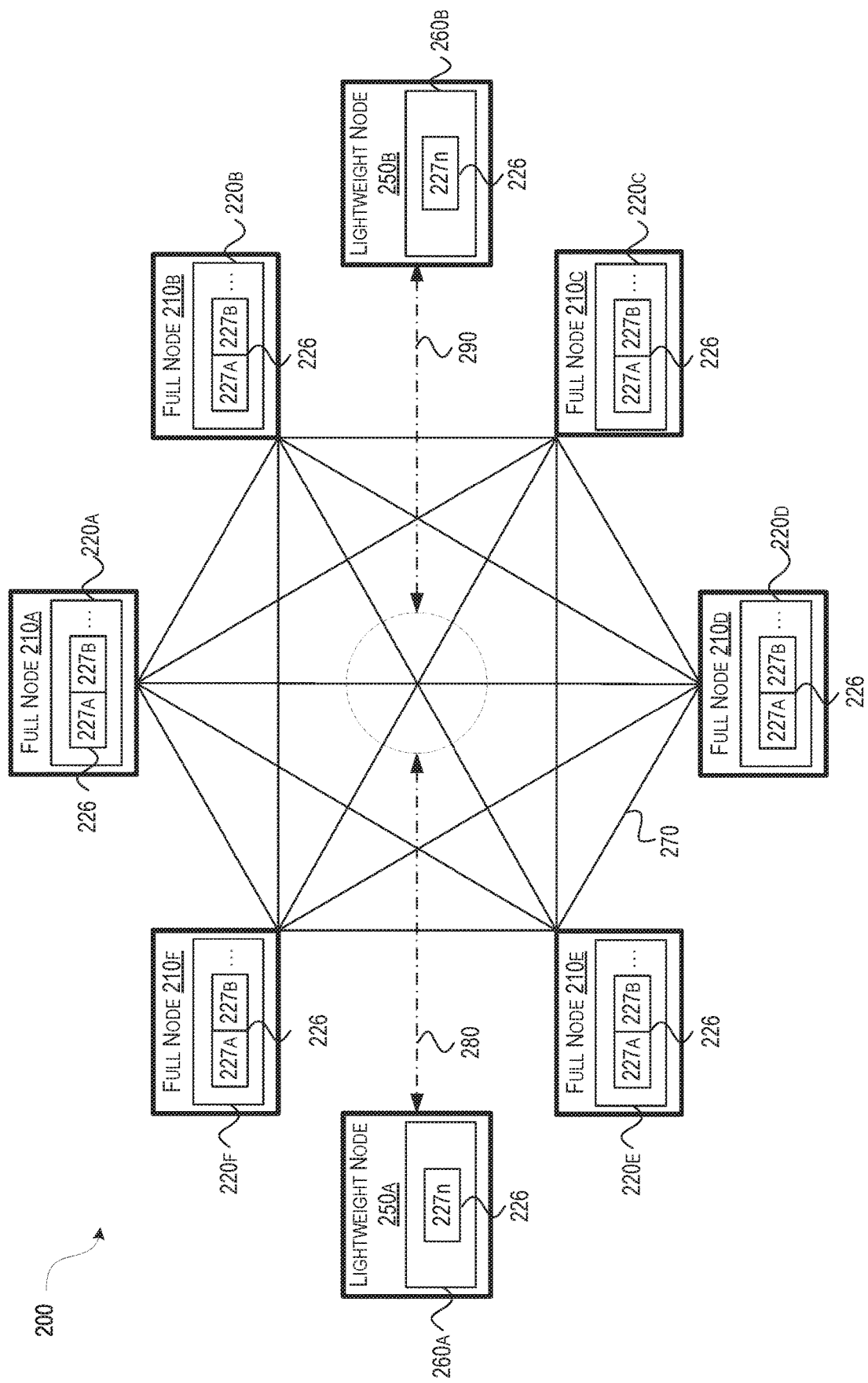
FIG. 2 depicts an illustrative example of decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to vote on delegates based on balance sheet holdings associated with the respective wallets. Full node computing devices 210A-210F, however, may not vote for themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce.

Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3:
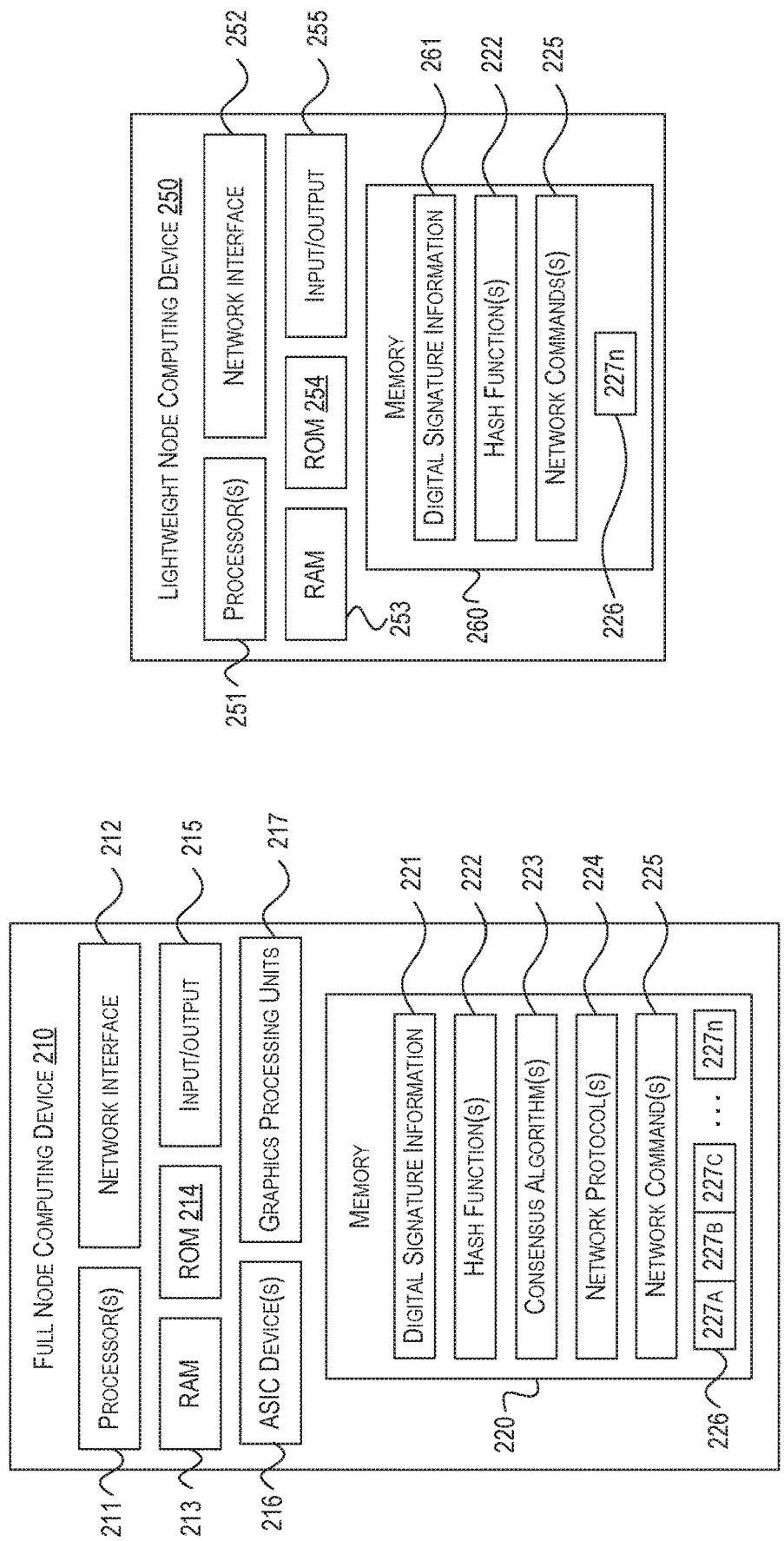
FIG. 3A depicts an illustrative example of a full node computing device that may be used in accordance with one or more illustrative aspects described herein.
FIG. 3B depicts an illustrative example of a lightweight node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, or the like), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, or the like.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, or the like), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Blockchain-Based Digital Token Utilization

Figure 4:
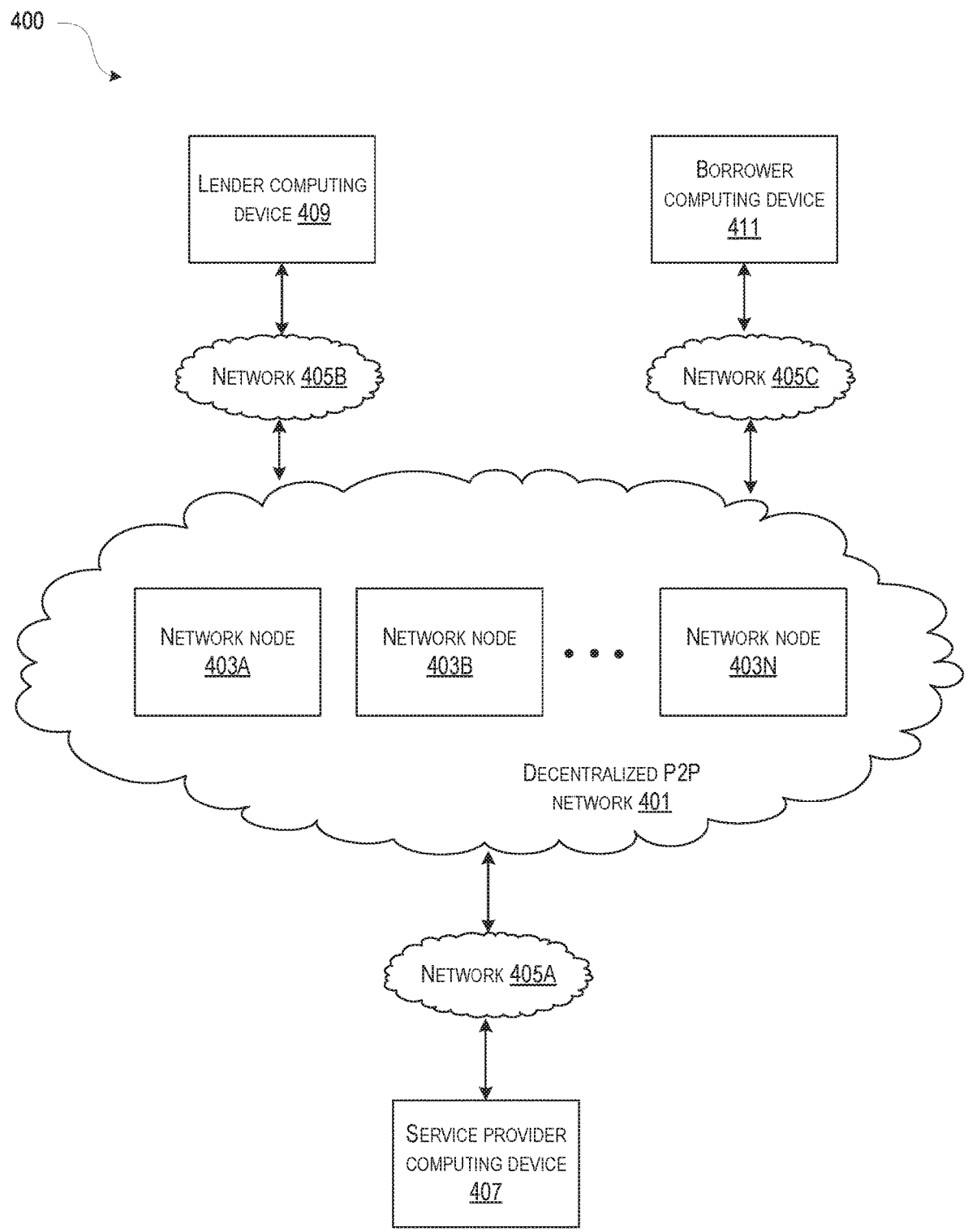
FIG. 4 depicts an illustrative digital token utilization system that may be used in accordance with one or more example embodiments described herein.

FIG. 4 depicts an illustrative digital token utilization system that may be used in accordance with one or more example embodiments described herein. Digital token utilization system 400 may include a decentralized P2P network 401, network nodes 403A-403N, networks 405A-405C, a service provider computing device 407, a lender computing device 409, and a borrower computing device 411. Service provider computing device 407 may communicate with decentralized P2P network 401 through network 405A. Lender computing device 409 may communicate with decentralized P2P network 401 through network 405B. Borrower computing device 411 may communicate with decentralized P2P network 401 through network 405C. Digital token utilization system 400 may include additional and/or other computing devices and/or networks similar to decentralized P2P network 401, network nodes 403A-403N, networks 405A-405C, service provider computing device 407, lender computing device 409, and borrower computing device 411.

Decentralized P2P network 401 may be a public or private decentralized network, and may be similar to decentralized P2P network 270 described above in connection with FIG. 2. Decentralized P2P network 401 may include network nodes 403A-403N. A network node of network nodes 403A-403N may be any type of computing device or computing platform. A network node of network nodes 403A-403N may be configured to operate as a full node in decentralized P2P network 401. A network node of network nodes 403A-403N may be similar to full node computing devices 201A-201F described above in connection with FIG. 2, or full node computing device 210 described above in connection with FIG. 3A. As such, a network node of network nodes 403A-403N may include (e.g., store in its memory) at least a portion of a blockchain corresponding to decentralized P2P network 401.

The blockchain corresponding to decentralized P2P network 401 may store information related to network functions (e.g., balance sheet transactions, data storage operations, smart contract operations, or the like) of decentralized P2P network 401. Additionally or alternatively, the blockchain of decentralized P2P network 401 may store information related to digital tokens, service provider tokens, credit tokens, and/or other types of tokens, as will be described in further detail below.

The digital tokens may include any type of digital token. The digital tokens may be cryptocurrency and/or cryptocurrency digitally backed by fiat currency, gold, or other objects of value. The service provider token may be a type of cryptocurrency and/or cryptocurrency digitally backed by fiat currency, gold, or other objects of value. The service provider token may be issued by service provider computing device 407 to facilitate depositing and withdrawing of the digital tokens as further discussed below. The credit token may be a type of token that represents its holder's reputation (e.g., the holder's creditworthiness). The credit token may be issued by service provider computing device 407. The credit token may be configured to be freely transferrable or not freely transferrable. The credit token may be used to facilitate lending the digital tokens as further discussed below.

As a full node in decentralized P2P network 401, a network node of network nodes 403A-403N may be configured to executed requested network functions, maintain inter-nodal agreement as to the state of the blockchain of decentralized P2P network 401, and request execution of network functions. Additionally or alternatively, a network node of network nodes 403A-403N may be configured to operate as a lightweight node.

Each of service provider computing device 407, lender computing device 409, and/or borrower computing device 411 may be configured to operate as a lightweight node communicating with decentralized P2P network 401. Each of service provider computing device 407, lender computing device 409, and/or borrower computing device 411 may be similar to lightweight node computing devices 250A-250B described above in connection with FIG. 2, or lightweight node computing device 250 described above in connection with FIG. 3B. As a lightweight node computing device, service provider computing device 407, lender computing device 409, and/or borrower computing device 411 may each be configured to interface with decentralized P2P network 401 by requesting execution of network functions related to facilitating the blockchain-based digital token utilization processes described herein. Additionally or alternatively, service provider computing device 407, lender computing device 409, and/or borrower computing device 411 may be configured to operate as a full node.

Each of service provider computing device 407, lender computing device 409, and/or borrower computing device 411 may be associated with a particular entity, such as a company or an enterprise organization. For example, service provider computing device 407 may be associated with a service provider, lender computing device 409 may be associated with a lender, and borrower computing device 411 may be associated with a borrower. The service provider may accept deposits of the digital tokens from the lender, and provide loans of the digital tokens to the borrower. Service provider computing device 407, lender computing device 409, and/or borrower computing device 411 may each be configured to interface with its associated entity via a user interface, a web interface, a computing device, or the like.

Each of service provider computing device 407, lender computing device 409, and/or borrower computing device 411 may have a digital token wallet stored in its memory which may be associated with a digital token. The digital token wallet may be associated with a public key, which may serve to identify the digital token wallet. The digital token wallet may be associated with a private key, which may be used to digitally sign requests and/or operations related to the digital token wallet in order to verify the authenticity of the requests and/or operations.

Each of service provider computing device 407 and/or lender computing device 409 may have a service provider token wallet stored in its memory which may be associated with the service provider token. Similar to the digital token wallets, the service provider token wallets may be associated with public keys and private keys. Each of service provider computing device 407 and/or borrower computing device 411 may have a credit token wallet stored in its memory which may be associated with the credit token. The credit token wallets may be associated with public keys and private keys. Additionally or alternatively, service provider computing device 407, lender computing device 409, and/or borrower computing device 411 may each have any other type of wallet associated with other types of tokens.

FIGS. 5A-5H depict an illustrative event sequence for digital token utilization in accordance with one or more example embodiments described herein. While the steps of the event sequence are described in a particular order, the steps may be performed in any order without departing from the scope of the disclosure provided herein. Although the event sequence is described as being performed by a particular arrangement of computing systems, devices, and networks (e.g., service provider computing device 407, lender computing device 409, borrower computing device 411, and network nodes 403A-403N in decentralized P2P network 401), the processes may be performed by a greater or smaller number of computing systems, devices, and/or networks, and/or by any type of computing system, device, and/or network.

Figure 5A:
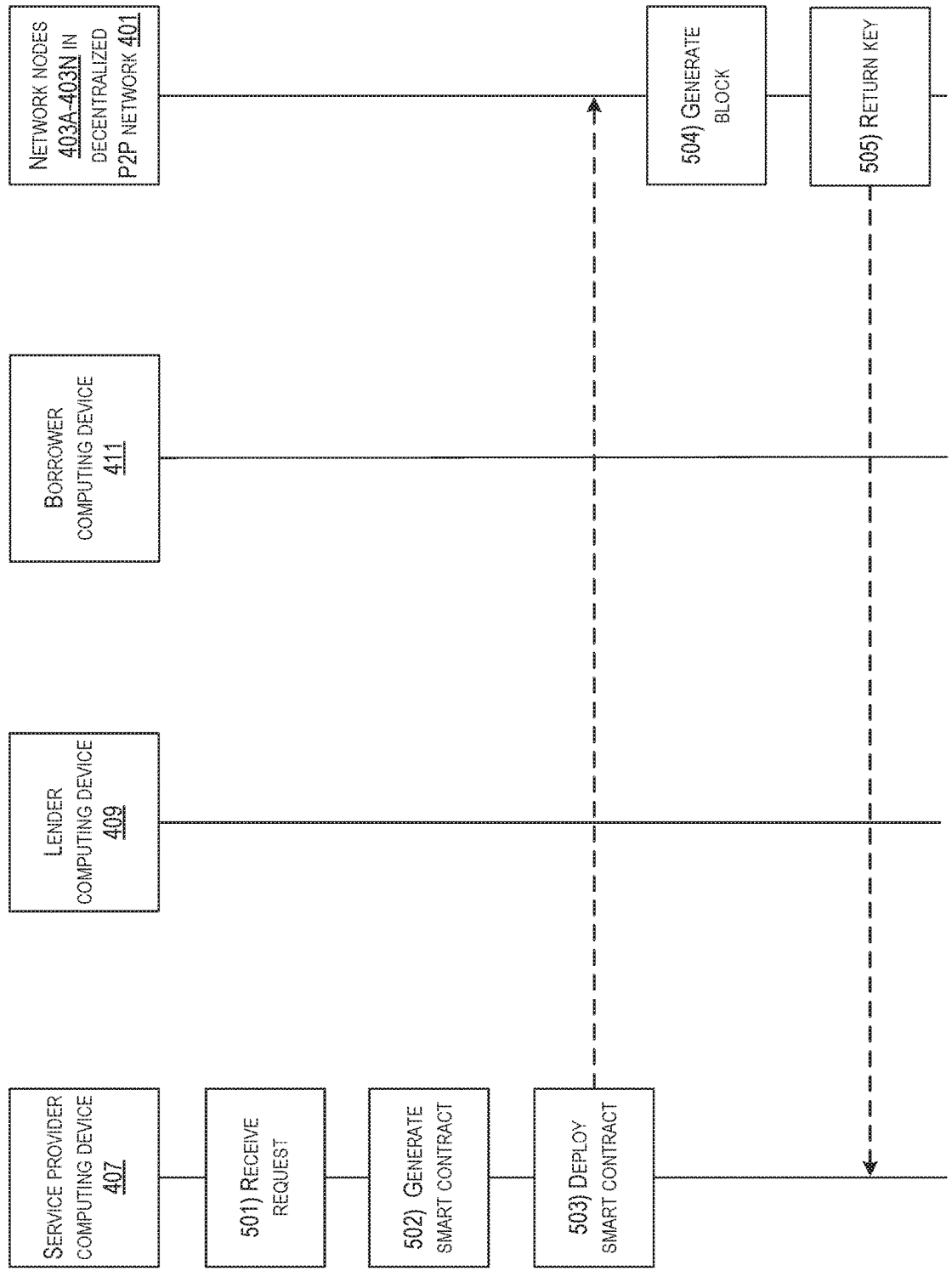
FIGS. 5A-5H depict an illustrative event sequence for digital token utilization in accordance with one or more example embodiments described herein.

Referring to FIG. 5A, in step 501, service provider computing device 407 may receive a digital token collection request. The digital token collection request may be received via an application operating locally on the service provider computing device 407. For example, a service provider associated with service provider computing device 407 may enter, via a user interface of the application, the digital token collection request. Additionally or alternatively, the digital token collection request may be received through a web interface associated with service provider computing device 407.

The digital token collection request may indicate that service provider computing device 407 intends to accept deposits of digital tokens. The digital token collection request may indicate a type of digital token, an appreciation rate associated with the digital token, an exchange rate between the digital token and the service provider token, and wallet information (e.g., public keys) associated with service provider computing device 407.

In step 502, service provider computing device 407 may generate a collection smart contract based on the digital token collection request. The collection smart contract may include one or more algorithms and/or computer executable functions that control the collecting and returning of digital tokens (e.g., in exchange of the service provider token). The collection smart contract may be configured to create a number of data fields, which may store values for an amount of digital tokens of a particular type (a digital token quantity data field), an amount of the service provider tokens (a service provider token quantity data field), an exchange rate between the digital token and the service provider token (an exchange rate data field), and/or an appreciation rate associated with the digital token (an appreciation rate data field).

In step 503, service provider computing device 407 may deploy the collection smart contract to the blockchain of decentralized P2P network 401. Service provider computing device 407 may compile the collection smart contract, and send, to decentralized P2P network 401, a network function request including the collection smart contract. The network function request may be broadcasted to network nodes 403A-403N. In some examples, the broadcasting of the network function request may be performed by each of the full node computing devices (e.g., network nodes 403A-403N) comprising decentralized P2P network 401 so that each of the full node computing devices receives the network function request.

In step 504, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain.

The generated block added to the blockchain of decentralized P2P network 401 may include the collection smart contract generated by service provider computing device 407. The operations of generating and adding the block to the blockchain may be similar to those described above in connection with FIG. 2.

In step 505, a public key corresponding to the collection smart contract stored in the blockchain of decentralized P2P network 401 may be returned by one or more of network nodes 403A-403N to service provider computing device 407. For example, the public key may be returned responsive to storing the collection smart contract on the blockchain of decentralized P2P network 401. The public key may uniquely identify the collection smart contract in the blockchain of decentralized P2P network 401.

Figure 5B:
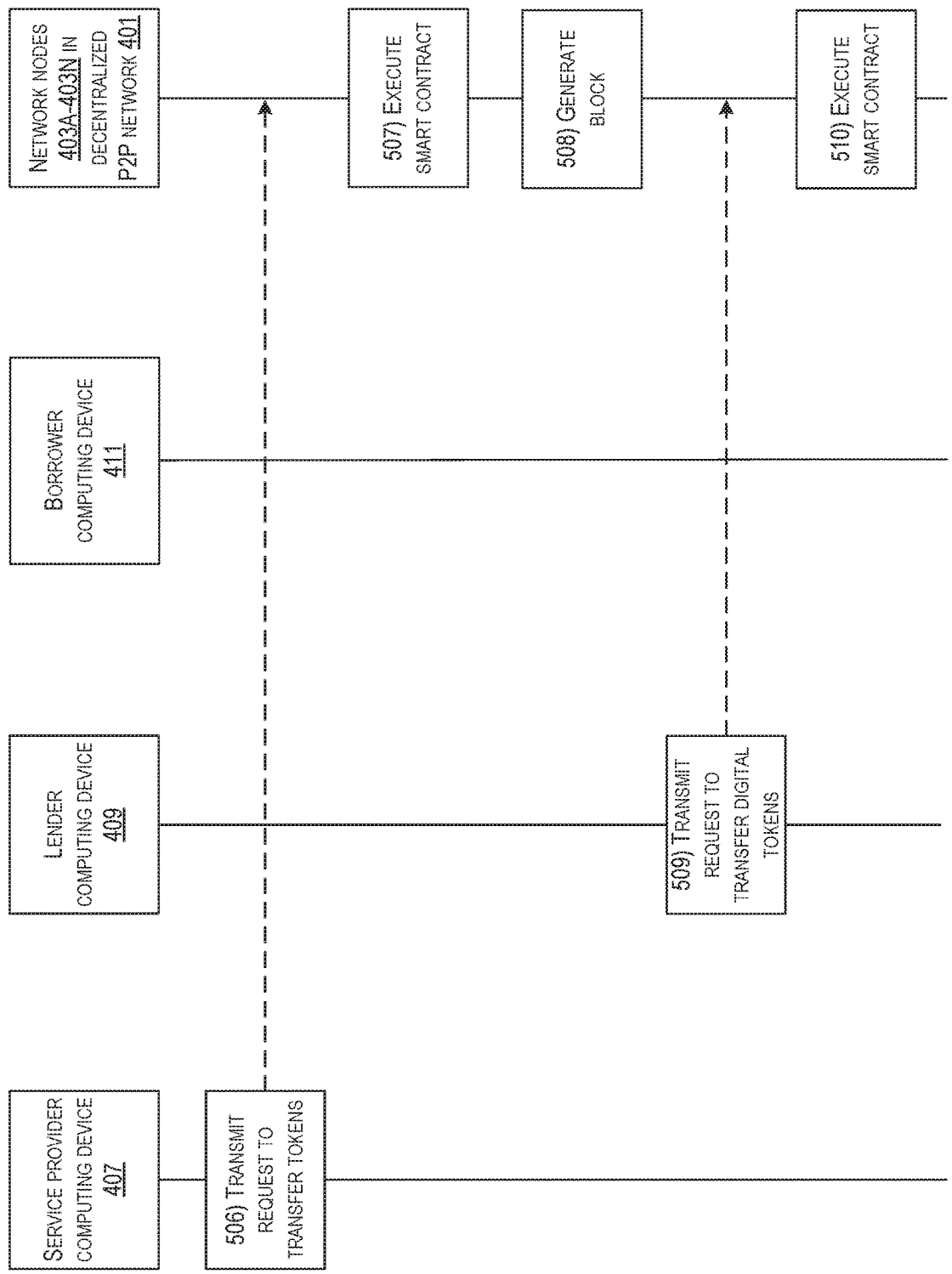

Referring to FIG. 5B, in step 506, service provider computing device 407 may send a token collection configuration request to network nodes 403A-403N in decentralized P2P network 401. The token collection configuration request may be a smart contract operation request, and may include the public key corresponding to the collection smart contract in the blockchain of decentralized P2P network 401.

The token collection configuration request may request to transfer an amount of digital tokens of a particular type from the digital token wallet associated with service provider computing device 407 to the collection smart contract. The request to transfer the digital token may be digitally signed by the private key of the digital token wallet associated with service provider computing device 407. Additionally or alternatively, the token collection configuration request may request to transfer an amount of the service provider tokens from the service provider token wallet associated with service provider computing device 407 to the collection smart contract. The request to transfer the service provider token may be digitally signed by the private key of the service provider token wallet associated with service provider computing device 407. The token collection configuration request may request to populate the exchange rate data field and/or the appreciation rate data field in the collection smart contract with the corresponding values specified in the digital token collection request.

In step 507, network nodes 403A-403N of decentralized P2P network 401 may receive the token collection configuration request (e.g., from service provider computing device 407), and may execute the collection smart contract (e.g., by applying the token collection configuration request to the collection smart contract).

For example, each of network nodes 403A-403N may identify, within the blockchain of decentralized P2P network 401, the block comprising the collection smart contract based on the public key corresponding to the collection smart contract. After verifying that the digital signatures associated with the token collection configuration request are valid, each of network nodes 403A-403N may transfer the digital token and/or the service provider token from the wallets associated with service provider computing device 407 to the collection smart contract. For example, each of network nodes 403A-403N may decrease the value of the digital token wallet associated with service provider computing device 407 by the amount specified in the token collection configuration request, and increase the value of the digital token quantity data field in the collection smart contract by the same amount. The digital tokens and/or service provider tokens may remain in the collection smart contract until further network function requests are received. Additionally or alternatively, based on the token collection configuration request, each of network nodes 403A-403N may set the values of the exchange rate data field and the appreciation rate data field in the collection smart contract.

In step 508, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the token collection configuration request generated by service provider computing device 407. Additionally or alternatively, the generated block may include the most recent state of the blockchain of decentralized P2P network 401 (e.g., values of wallets, values of data fields in smart contracts, or the like) after applying the token collection configuration request to the collection smart contract.

In step 509, lender computing device 409 may send a lender input request to network nodes 403A-403N in decentralized P2P network 401. The lender input request may be a smart contract operation request, and may include the public key corresponding to the collection smart contract in the blockchain of decentralized P2P network 401.

The lender input request may request to transfer digital tokens of a particular type from the digital token wallet associated with lender computing device 409 to the collection smart contract. The lender input request may indicate that lender computing device 409 intends to deposit an amount of the digital tokens for an appreciation rate. The lender input request may specify the quantity of the digital tokens that lender computing device 409 intends to transfer. The lender input request may be digitally signed by a private key of the digital token wallet associated with lender computing device 409.

In step 510, network nodes 403A-403N of decentralized P2P network 401 may receive the lender input request (e.g., from lender computing device 409), and may execute the collection smart contract (e.g., by applying the lender input request to the collection smart contract). For example, each of network nodes 403A-403N may identify, within the blockchain of decentralized P2P network 401, the block comprising the collection smart contract based on the public key corresponding to the collection smart contract. After verifying that the digital signature associated with the lender input request is valid, each of network nodes 403A-403N may transfer the specified amount of the digital tokens from the digital token wallet associated with lender computing device 409 to the collection smart contract. For example, each of network nodes 403A-403N may decrease the value of the digital token wallet associated with lender computing device 409 by the specified amount, and may increase the value of the digital token quantity data field in the collection smart contract by the specified amount.

Figure 5C:
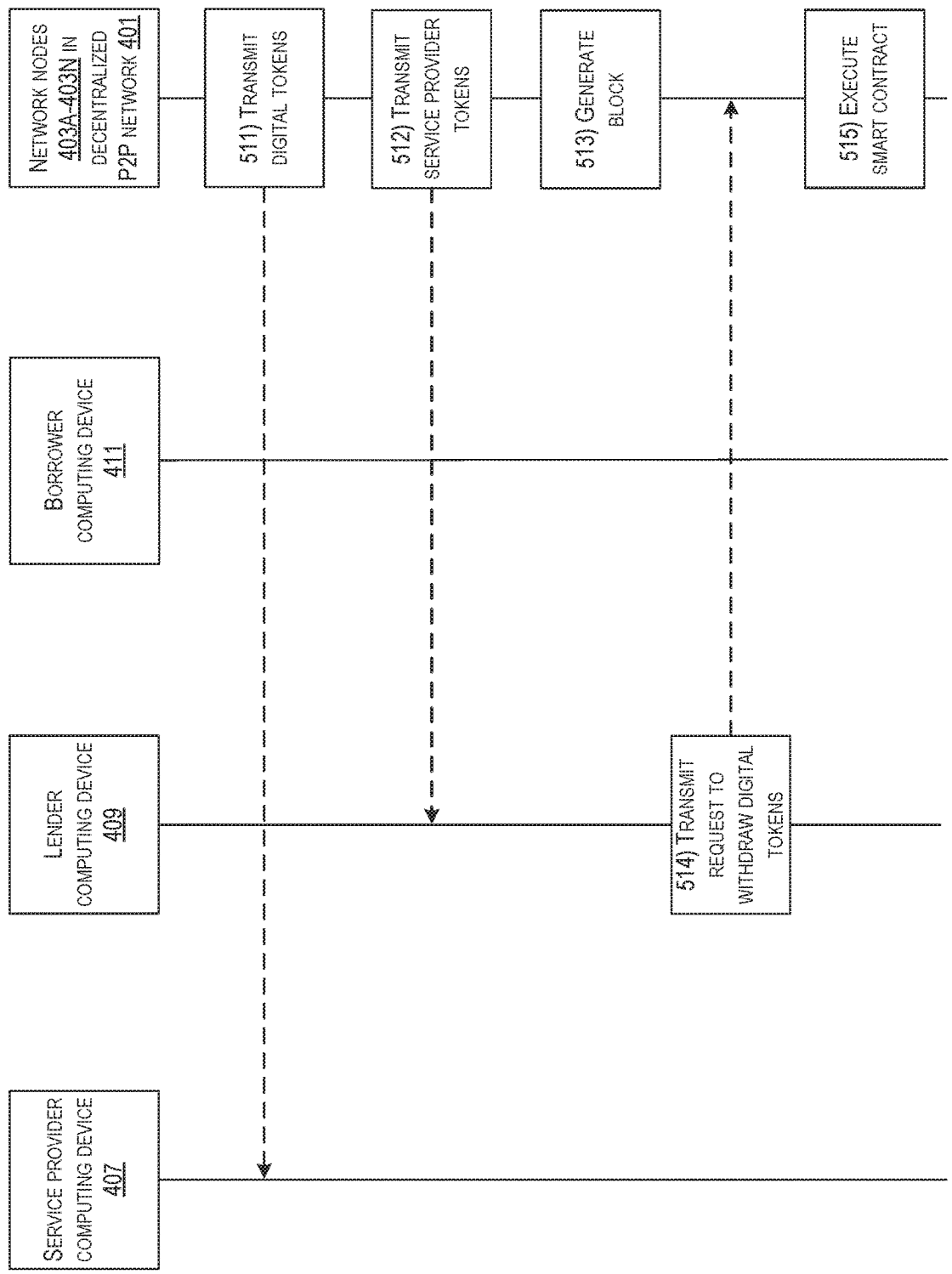

Referring to FIG. 5C, in step 511, execution of the collection smart contract may cause network nodes 403A-403N to transmit the digital tokens to the digital token wallet associated with service provider computing device 407. For example, service provider computing device 407 may have a digital token wallet stored in its memory which may be associated with the digital token, and execution of the collection smart contract may cause network nodes 403A-403N to transmit the digital tokens to service provider computing device 407.

The amount of the digital tokens to be transmitted to the digital token wallet associated with service provider computing device 407 may be all or a portion of the digital tokens received from the digital token wallet associated with lender computing device 409. For example, a portion of the digital tokens received from the digital token wallet associated with lender computing device 409 may remain in the collection smart contract as anytime available digital tokens for lender computing device 409 to withdraw in step 514. The portion remaining in the collection smart contract may be calculated based on historical withdrawal events. Additionally or alternatively, a portion of the digital tokens received from the digital token wallet associated with lender computing device 409 may be transferred to a distribution smart contract configured to facilitate lending digital tokens to borrower computing device 411 as discussed below.

In step 512, execution of the collection smart contract may cause network nodes 403A-403N to transmit the service provider tokens to the service provider token wallet associated with lender computing device 409. For example, lender computing device 409 may have a service provider token wallet stored in its memory which may be associated with the service provider token, and execution of the collection smart contract may cause network nodes 403A-403N to transmit the service provider tokens to lender computing device 409.

The amount of the service provider tokens to be transmitted to the service provider token wallet associated with lender computing device 409 may be determined based on the amount of the digital tokens received from the digital token wallet associated with lender computing device 409 and the exchange rate between the digital token and the service provider token. For example, if the exchange rate between the digital token and the service provider token is R:1, the amount of the service provider tokens to be transmitted to the service provider token wallet associated with lender computing device 409 may be the amount of the digital tokens received from the digital token wallet associated with lender computing device 409 divided by R. Different types of digital tokens may have same or different exchange rates to the service provider token.

The service provider token may be used to facilitate the deposit and withdrawal of the digital token. The service provider token may be issued by service provider computing device 407. For example, the service provider token may be issued according to a particular technical standard, such as the ERC20 technical standard. Additionally or alternatively, the service provider token may be backed by physical objects of value, which may be audited by a third party.

In step 513, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the lender input request generated by lender computing device 409. Additionally or alternatively, the generated block may include the most recent state of the blockchain of decentralized P2P network 401 (e.g., values of wallets, values of data fields in smart contracts, or the like) after applying the lender input request to the collection smart contract.

In step 514, lender computing device 409 may send a lender output request to network nodes 403A-403N in decentralized P2P network 401. The lender output request may be a smart contract operation request, and may include the public key corresponding to the collection smart contract in the blockchain of decentralized P2P network 401.

The lender output request may request to transfer an amount of the service provider tokens from the service provider token wallet associated with lender computing device 409 to the collection smart contract. The lender output request may indicate that lender computing device 409 intends to withdraw an amount of digital tokens of a particular type based on the returned service provider tokens. The lender output request may specify the amount of the service provider tokens that lender computing device 409 intends to transfer. The lender output request may be signed by a private key of the service provider token wallet associated with lender computing device 409.

In step 515, network nodes 403A-403N of decentralized P2P network 401 may receive the lender output request (e.g., from lender computing device 409), and may execute the collection smart contract (e.g., by applying the lender output request to the collection smart contract), in a similar manner as in step 510.

For example, each of network nodes 403A-403N may identify, within the blockchain of decentralized P2P network 401, the block comprising the collection smart contract based on the public key corresponding to the collection smart contract. After verifying that the digital signature associated with the lender output request is valid, each of network nodes 403A-403N may transfer the specified amount of the service provider tokens from the service provider token wallet associated with lender computing device 409 to the collection smart contract. For example, each of network nodes 403A-403N may decrease the value of the service provider token wallet associated with lender computing device 409 by the amount specified in the lender output request, and may increase the value of the service provider token quantity data field in the collection smart contract by the specified amount.

Figure 5D:
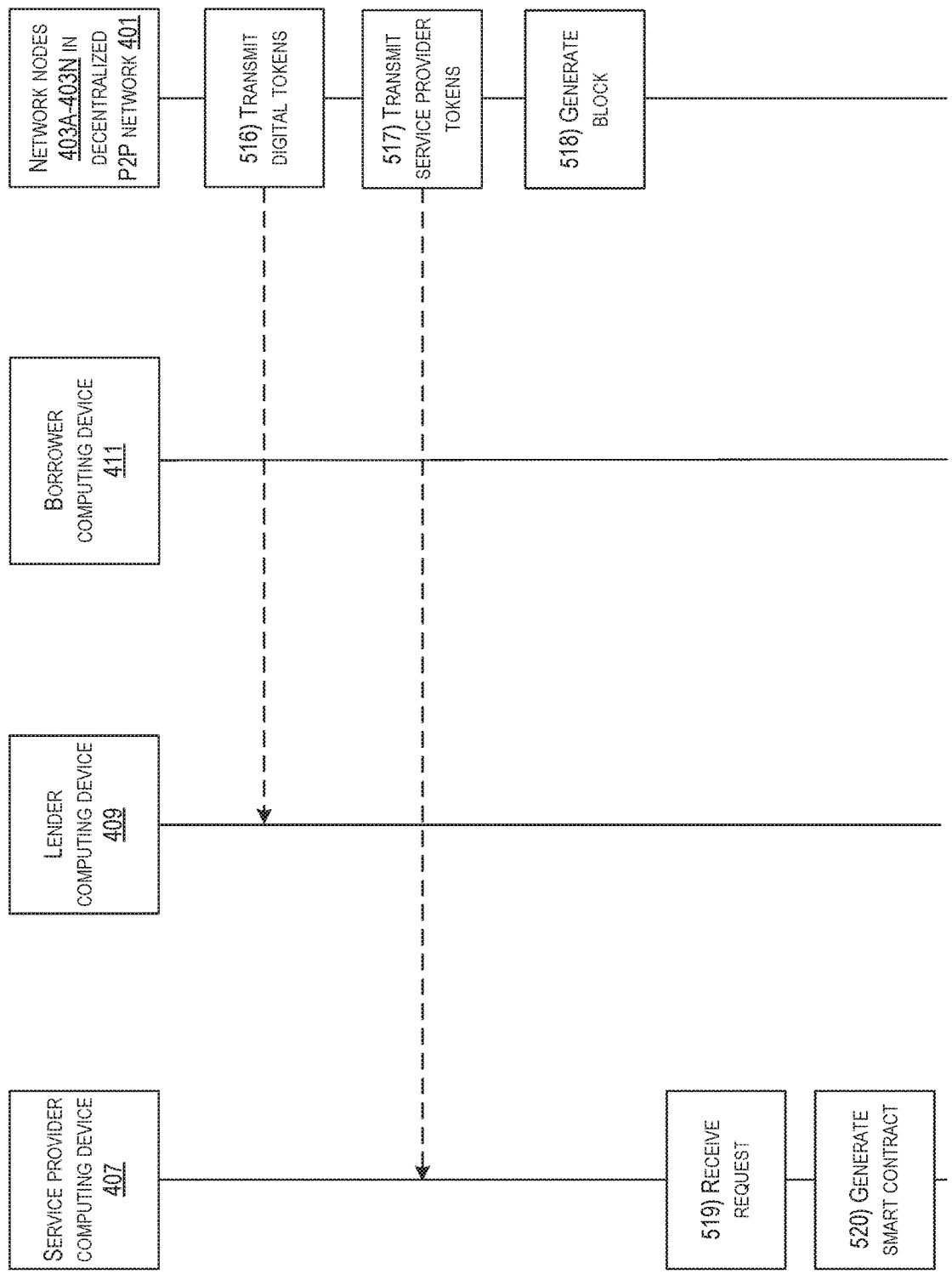

Referring to FIG. 5D, in step 516, execution of the collection smart contract may cause network nodes 403A-403N to transmit the digital tokens to the digital token wallet associated with lender computing device 409. For example, lender computing device 409 may have a digital token wallet stored in its memory which may be associated with the digital token, and execution of the collection smart contract may cause network nodes 403A-403N to transmit the digital tokens to lender computing device 409.

The amount of the digital tokens to be transmitted to the digital token wallet associated with lender computing device 409 may be determined based on the amount of the service provider tokens received from the service provider token wallet associated with lender computing device 409 and an updated exchange rate between the digital token and the service provider token.

The exchange rate between the digital token and the service provider token may be updated based on the appreciation rate associated with the digital token. The appreciation rate may be a rate per second, a rate per minute, a rate per hour, a rate per day, or the like. Execution of the collection smart contract may cause network nodes 403A-

403N to determine a time period between receiving the lender input request and receiving the lender output request (e.g., based on timestamps recorded at the time of receiving the requests). The network nodes 403A-403N may calculate an overall appreciation rate for the determined time period based on the appreciation rate and the time period (e.g., through the simple interest calculation method, the compound interest calculation method, or the like). The updated exchange rate may be equal to the previous exchange rate multiplied by the overall appreciation rate for the determined time period.

Additionally or alternatively, the network nodes 403A-403N may periodically update the exchange rate (e.g., every hour, every day, or the like). Additionally or alternatively, the network nodes 403A-403N may update the exchange rate every time the collection smart contract is executed. In such arrangements, the exchange rate between the digital token and the service provider token may be constantly increasing, representing the appreciation value of the deposited digital tokens. For example, when lender computing device 409 deposits the digital tokens to the collection smart contract, the exchange rate between the digital token and the service provider token may be 101:100. When lender computing device 409 withdraws the digital tokens from the collection smart contract, the exchange rate between the digital token and the service provider token may be 101.05:100 (increased based on the appreciation rate associated with the digital token). Lender computing device 409 may withdraw its deposited digital tokens together with interest based on simply transmitting the service provider tokens to the collection smart contract.

In step 517, execution of the collection smart contract may cause network nodes 403A-403N to transmit the service provider tokens to the service provider token wallet associated with service provider computing device 407. For example, service provider computing device 407 may have a service provider token wallet stored in its memory which may be associated with the service provider token, and execution of the collection smart contract may cause network nodes 403A-403N to transmit the service provider tokens to service provider computing device 407.

The amount of the service provider tokens to be transmitted to the service provider token wallet associated with service provider computing device 407 may be all or a portion of the service provider tokens received from the service provider token wallet associated with lender computing device 409. For example, a portion of the service provider tokens received from the service provider token wallet associated with lender computing device 409 may remain in the collection smart contract for future use. The portion remaining in the collection smart contract may be determined based on historical deposit events.

In step 518, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the lender output request generated by lender computing device 409. Additionally or alternatively, the generated block may include the most recent state of the blockchain of decentralized P2P network 401 (e.g., values of wallets, values of data fields in smart contracts, or the like) after applying the lender output request to the collection smart contract.

In step 519, service provider computing device 407 may receive a digital token distribution request. The digital token distribution request may be received via an application operating locally on the service provider computing device 407. For example, a service provider associated with service provider computing device 407 may enter, via a user interface of the application, the digital token distribution request. Additionally or alternatively, the digital token distribution request may be received through a web interface associated with service provider computing device 407.

The digital token distribution request may indicate that service provider computing device 407 intends to provide loans of digital tokens of a particular type. The digital token distribution request may indicate a type of digital token, an interest rate associated with the digital token, conditions for allocating an amount of the digital tokens to borrower computing device 411 (e.g., an exchange rate between the digital token and a credit token), and wallet information (e.g., public keys) associated with service provider computing device 407.

For different types of digital tokens, same or different interest rates may be used. The interest rates associated with the different types of digital tokens may be determined based on the risk levels associated with the different digital tokens, the market values of the different digital tokens, or the like. Additionally or alternatively, the interest rate associated with a type of digital token may be determined based on the appreciation rate, associated with the digital token, which is used in the collection smart contract. For example, the interest rate associated with the digital token may be set to be higher than the appreciation rate associated with the digital token.

In step 520, service provider computing device 407 may generate a distribution smart contract based on the digital token distribution request. The distribution smart contract may include one or more algorithms and/or computer executable functions that control the distributing and recollecting of the digital tokens.

The distribution smart contract may be configured to create a number of data fields, which may store values for an amount of digital tokens of a particular type (a digital token quantity data field), quantities of other types of tokens (token quantity data fields), exchange rates between the digital token and the other types of tokens (exchange rate data fields), and/or an interest rate associated with the digital token (interest rate data field).

The distribution smart contract may include programmatic conditions for allocating the digital tokens to borrower computing device 411. For example, borrower computing device 411 may transmit another type of token (e.g., the credit token) to the distribution smart contract as collateral, and the distribution smart contract may use an exchange rate between the digital token and the other type of token to calculate whether and/or how much digital tokens may be distributed to borrower computing device 411. Additionally or alternatively, the distribution smart contract may allow borrower computing device 411 to get an amount of the digital tokens even if the distribution smart contract does not receive any tokens as collateral. After receiving, from borrower computing device 411, a request to obtain an amount of the digital tokens, the distribution smart contract may request authorization from service provider computing device 407 before sending the requested digital tokens to borrower computing device 411. Service provider computing device 407 may assess whether to authorize sending the digital tokens to borrower computing device 411 based on various factors, such as a credit score associated with borrower computing device 411.

Figure 5E:
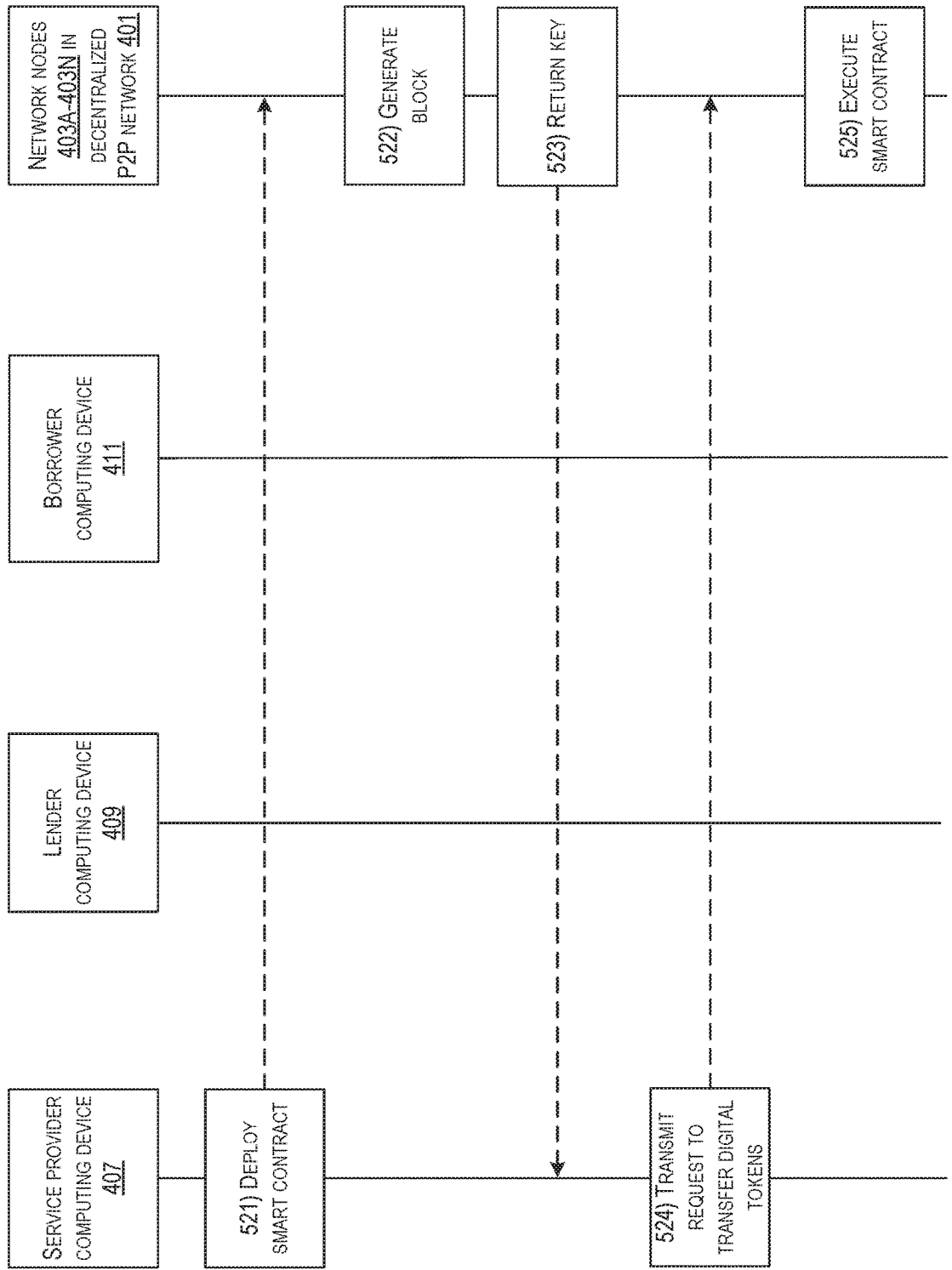

Referring to FIG. 5E, in step 521, service provider computing device 407 may deploy the distribution smart contract to the blockchain of decentralized P2P network 401. Service provider computing device 407 may compile the distribution smart contract, and send, to decentralized P2P network 401, a network function request including the distribution smart contract. The network function request may be broadcasted to network nodes 403A-403N. In some examples, the broadcasting of the network function request may be performed by each of the full node computing devices (e.g., network nodes 403A-403N) comprising decentralized P2P network 401 so that each of the full node computing devices receives the network function request.

In step 522, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2. The generated block added to the blockchain of decentralized P2P network 401 may include the distribution smart contract generated by service provider computing device 407.

In step 523, a public key corresponding to the distribution smart contract in the blockchain of decentralized P2P network 401 may be returned by one or more of network nodes 403A-403N to service provider computing device 407. For example, the public key may be returned responsive to storing the distribution smart contract on the blockchain of decentralized P2P network 401. The public key may uniquely identify the distribution smart contract in the blockchain of decentralized P2P network 401.

In step 524, service provider computing device 407 may send a token distribution configuration request to network nodes 403A-403N in decentralized P2P network 401. The token distribution configuration request may be a smart contract operation request, and may include the public key corresponding to the distribution smart contract in the blockchain of decentralized P2P network 401.

The token distribution configuration request may request to transfer an amount of the digital tokens from the digital token wallet associated with service provider computing device 407 to the distribution smart contract. The transfer request may be signed by a private key of the digital token wallet associated with service provider computing device 407. The token distribution configuration request may request to populate the exchange rate data fields and/or the interest rate data field in the distribution smart contract with values specified in the digital token distribution request.

In step 525, the network nodes 403A-403N of decentralized P2P network 401 may receive the token distribution configuration request (e.g., from service provider computing device 407), and may executed the distribution smart contract (e.g., by applying the token distribution configuration request to the distribution smart contract).

For example, each of network nodes 403A-403N may identify, within the blockchain of decentralized P2P network 401, the block comprising the distribution smart contract based on the public key corresponding to the distribution smart contract. After verifying that the digital signature associated with the token distribution configuration request is valid, each of network nodes 403A-403N may transfer the digital tokens from the digital token wallet associated with service provider computing device 407 to the distribution smart contract. For example, each of the network nodes 403A-403N may decrease the value of the digital token wallet associated with service provider computing device 407 by an amount (e.g., specified in the token distribution configuration request), and increase the value of the digital token quantity data field in the distribution smart contract by the same amount. The digital tokens may remain in the distribution smart contract until further network function requests are received. Additionally or alternatively, based on the token distribution configuration request, each of network nodes 403A-403N may set the values of the exchange rate data fields and/or the interest rate data field in the distribution smart contract.

Figure 5F:
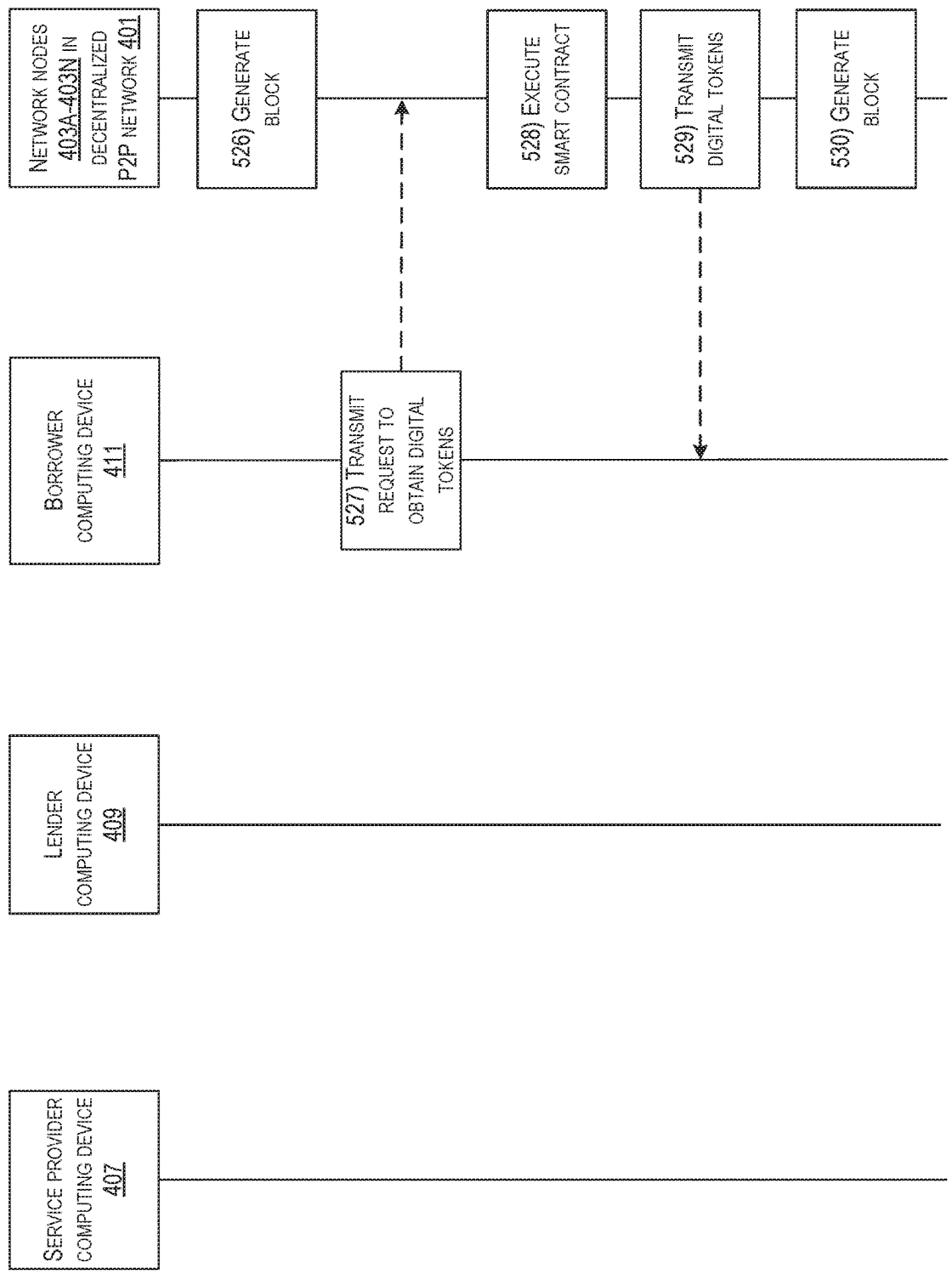

Referring to FIG. 5F, in step 526, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the token distribution configuration request generated by service provider computing device 407. Additionally or alternatively, the generated block may include the most recent state of the blockchain of decentralized P2P network 401 (e.g., values of wallets, values of data fields in smart contracts, or the like) after applying the token distribution configuration request to the distribution smart contract.

In step 527, borrower computing device 411 may send a borrower output request to network nodes 403A-403N in decentralized P2P network 401. The borrower output request may be a smart contract operation request, and may include the public key corresponding to the distribution smart contract in the blockchain of decentralized P2P network 401.

The borrower output request may request to transfer an amount of the digital tokens from the distribution smart contract to the digital token wallet associated with borrower computing device 411. The borrower output request may indicate that borrower computing device 411 intends to obtain an amount of the digital tokens at an interest rate.

Additionally or alternatively, the borrower output request may request to transfer other types of tokens as collateral from wallets associated with borrower computing device 411 to the distribution smart contract. The other types of tokens may include, for example, a credit token or digital tokens of types other than the type that borrower computing device 411 intends to obtain. The other types of tokens may be backed by gold, real property, personal property, intellectual property, or the like, which may be audited by a third party.

The credit token may be issued by service provider computing device 407. The credit token may be configured to be freely transferrable or not freely transferrable. When borrower computing device 411 begins to participate in decentralized P2P network 401, service provider computing device 407 may issue an initial amount of the credit tokens to borrower computing device 411. The initial amount of the credit tokens may be determined based on a credit score associated with borrower computing device 411. The credit score may be determined based on, for example, data obtained from government agencies, insurance companies, telecommunication providers, utility providers, or the like.

Additionally or alternatively, the credit token may be issued to borrower computing device 411 based on historical event data associated with borrower computing device 411. As discussed in more details below, if borrower computing device 411 returns its obtained digital tokens with additional digital tokens as interest and within a threshold period, an amount of the credit tokens may be issued to borrower computing device 411 as a reward and as an indication of the increasing creditworthiness of borrower computing device 411.

In step 528, network nodes 403A-403N of decentralized P2P network 401 may receive the borrower output request (e.g., from borrower computing device 411), and may execute the distribution smart contract (e.g., by applying the borrower output request to the distribution smart contract).

For example, each of network nodes 403A-403N may identify, within the blockchain of decentralized P2P network 401, the block comprising the distribution smart contract based on the public key corresponding to the distribution smart contract. After verifying that the digital signature(s) associated with the borrower output request is valid, each of network nodes 403A-403N may transfer, from the credit token wallet associated with borrower computing device 411 to the distribution smart contract, an amount of credit tokens (e.g., specified in the borrower output request). For example, each of network nodes 403A-403N may decrease the value of the credit token wallet associated with borrower computing device 411 by the specified amount, and may increase the value of a credit token quantity data field in the distribution smart contract by the specified amount. The credit tokens may remain in the distribution smart contract. Additionally or alternatively, execution of the distribution smart contract may cause other types of tokens to be transferred from wallets associated with borrower computing device 411 to the distribution smart contract.

In step 529, execution of the distribution smart contract may cause network nodes 403A-403N to transmit the digital tokens to the digital token wallet associated with borrower computing device 411. For example, borrower computing device 411 may have a digital token wallet stored in its memory which may be associated with the digital token, and execution of the collection smart contract may cause network nodes 403A-403N to transmit the digital tokens to borrower computing device 411.

The amount of the digital tokens to be transmitted to the digital token wallet associated with borrower computing device 411 may be determined based on the other types of tokens received from the borrower computing device 411. For example, the amount of the digital tokens to be transmitted may be determined based on an exchange rate between the digital token and the credit token.

In step 530, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the borrower output request generated by borrower computing device 411. Additionally or alternatively, the generated block may include the most recent state of the blockchain of decentralized P2P network 401 (e.g., values of wallets, values of data fields in smart contracts, or the like) after applying the borrower output request to the distribution smart contract.

Figure 5G:
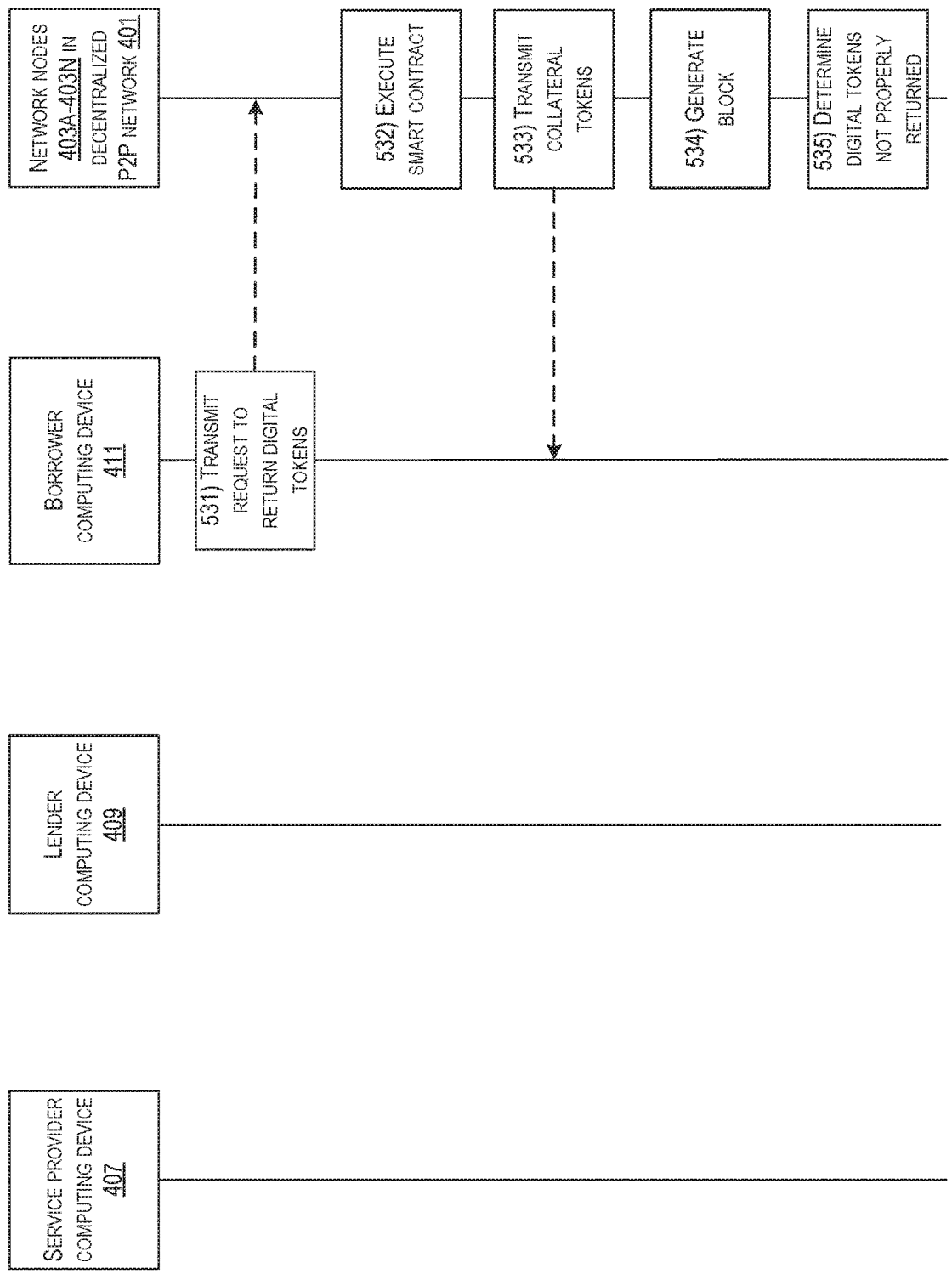
Figure 5H:
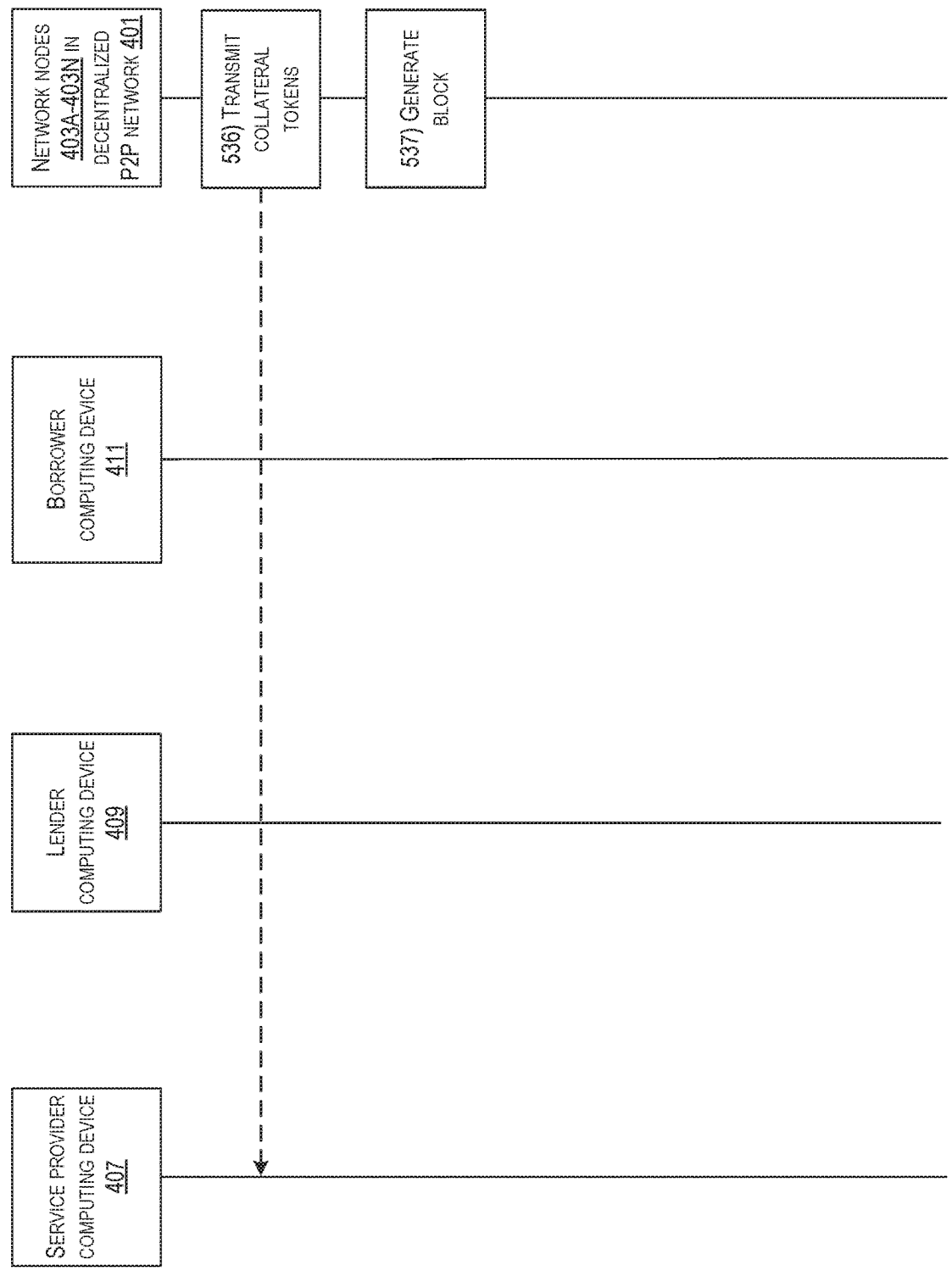

Referring to FIG. 5G, in step 531, borrower computing device 411 may send a borrower input request to network nodes 403A-403N in decentralized P2P network 401. The borrower input request may be a smart contract operation request, and may include the public key corresponding to the distribution smart contract in the blockchain of decentralized P2P network 401.

The borrower input request may request to transfer the obtained digital tokens plus an additional amount of the digital tokens representing interest from the digital token wallet associated with borrower computing device 411 to the distribution smart contract. The borrower input request may indicate that borrower computing device 411 intends to return the obtained digital tokens. The borrower input request may be signed by a private key of the digital token wallet associated with borrower computing device 411.

In step 532, network nodes 403A-403N of decentralized P2P network 401 may receive the borrower input request (e.g., from borrower computing device 411), and may execute the distribution smart contract (e.g., by applying the borrower input request to the distribution smart contract).

For example, each of network nodes 403A-403N may identify, within the blockchain of decentralized P2P network 401, the block comprising the distribution smart contract based on the public key corresponding to the distribution smart contract. After verifying that the digital signature associated with the borrower input request is valid, each of network nodes 403A-403N may transfer the specified amount of the digital tokens from the digital token wallet associated with borrower computing device 411 to the distribution smart contract. For example, each of network nodes 403A-403N may decrease the value of the digital token wallet associated with borrower computing device 411 by the specified amount, and may increase the value of the digital token quantity data field in the distribution smart contract by the specified amount.

In step 533, execution of the collection smart contract may cause network nodes 403A-403N to transmit the tokens representing collateral (e.g., the credit tokens) to the wallets associated with borrower computing device 411. For example, borrower computing device 411 may have wallets stored in its memory which may be associated with the collateral token, and execution of the collection smart contract may cause network nodes 403A-403N to transmit the collateral tokens to borrower computing device 411.

Network nodes 403A-403N may return the collateral tokens previously received from the wallets associated with borrower computing device 411. Additionally or alternatively, responsive to determining that borrower computing device 411 has returned the borrowed digital tokens within a particular time threshold, network nodes 403A-403N may transmit an additional amount of credit tokens to wallets associated with borrower computing device 411 as a reward.

This additional amount of credit tokens can be used to implement a reputation based lending system.

In step 534, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the borrower input request generated by borrower computing device 411. Additionally or alternatively, the generated block may include the most recent state of the blockchain of decentralized P2P network 401 (e.g., values of wallets, values of data fields in smart contracts, or the like) after applying the borrower input request to the distribution smart contract.

In step 535, as an additional or alternative step to step 533, network nodes 403A-403N may determine that borrower computing device 411 fails to properly return its obtained digital tokens with an additional amount of the digital tokens representing interest on time. Network nodes 403A-403N may record the time when borrower computing device 411 obtained the digital tokens (e.g., in step 527), and may set a time threshold within which borrower computing device 411 is to return the obtained digital tokens together with an additional amount of the digital tokens representing interest. The additional amount of the digital tokens may be determined based on the value of the interest rate data field in the distribution smart contract and the set time threshold. Execution of the distribution smart contract may cause network nodes 403A-403N to determine whether the correct amount of the digital tokens are returned by borrower computing device 411. If the answer to this question is no, network nodes 403A-403N may proceed to step 536.

Additionally or alternatively, network nodes 403A-403N may periodically determine whether the time threshold has been reached since borrower computing device 411 obtained the digital tokens. If network nodes 403A-403N determines that the time threshold has been reached and borrower computing device 411 has not returned the digital tokens, network nodes 403A-403N may proceed to step 536.

In step 536, execution of the distribution smart contract may cause network nodes 403A-403N to transmit the credit tokens (that may have been received from borrower computing device 411) to a credit token wallet associated with service provider computing device 407. For example, service provider computing device 407 may have a credit token wallet stored in its memory which may be associated with the credit token, and execution of the distribution smart contract may cause network nodes 403A-403N to transmit the credit tokens to service provider computing device 407. Additionally or alternatively, execution of the distribution smart contract may cause network nodes 403A-403N to forfeit or destroy all or a portion of the credit tokens. Additionally or alternatively, the other types of tokens that were received as collateral from borrower computing device 411 in step 527 may be similarly transmitted to service provider computing device 407.

In step 537, at least one of network nodes 403A-403N in decentralized P2P network 401 may generate a block corresponding to the blockchain of decentralized P2P network 401, and may add the block to the blockchain. For example, the network node of network nodes 403A-403N that generates the block may broadcast the block to other network nodes of network nodes 403A-403N. The other network nodes of network nodes 403A-403N may validate the block, and add the block to their copies of the blockchain. The operations of generating and adding the block to the blockchain may be similar to those described above in connection with FIG. 2.

The generated block added to the blockchain of decentralized P2P network 401 may include the determination that borrower computing device 411 failed to properly return its obtained digital tokens on time. Additionally or alternatively, the generated block may include the most recent state of the blockchain of decentralized P2P network 401 (e.g., values of wallets, values of data fields in smart contracts, or the like) after transmitting the collateral tokens to service provider computing device 407.

Figure 6:
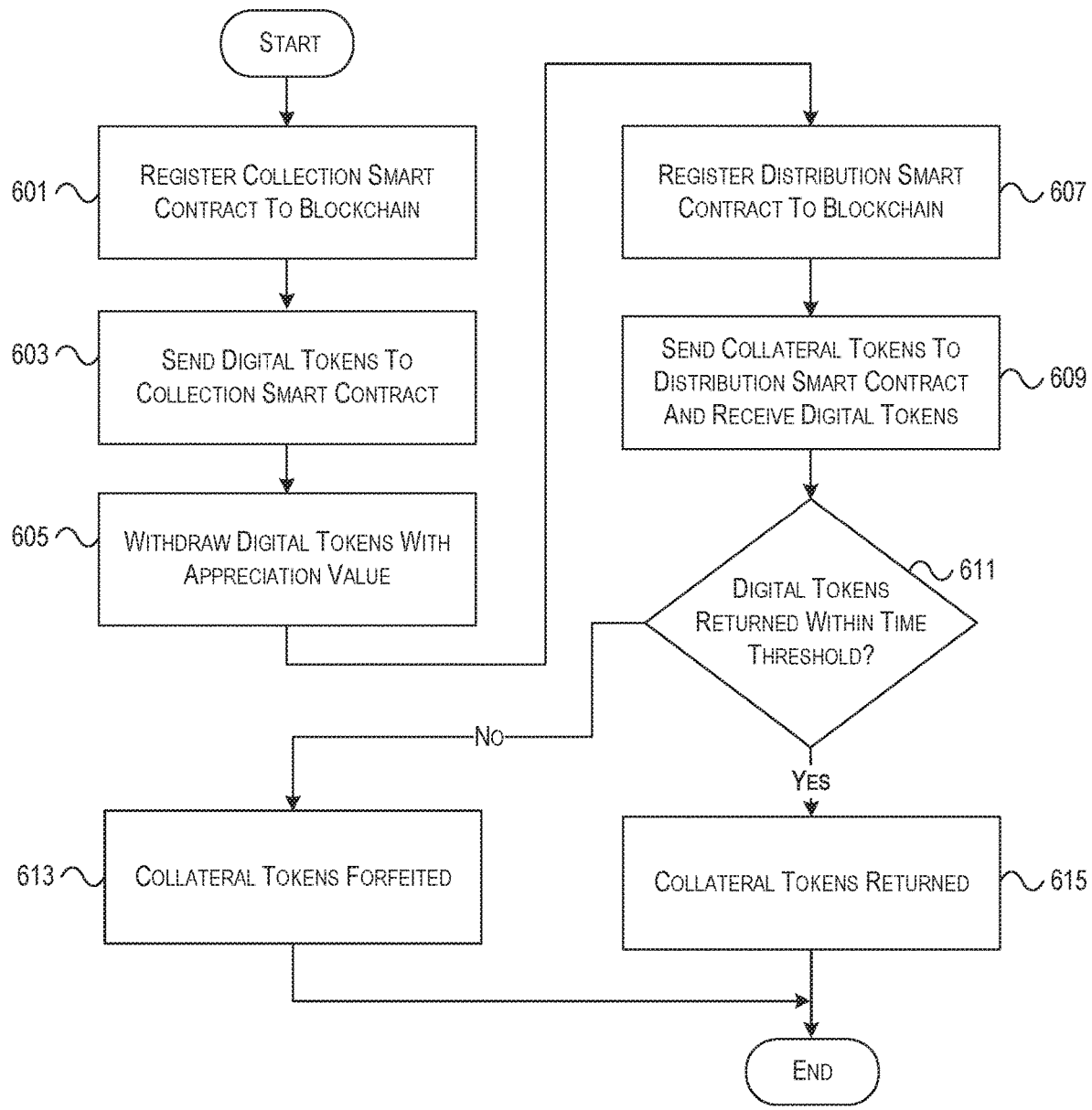
FIG. 6 depicts an illustrative method for digital token utilization in accordance with one or more example embodiments described herein.

FIG. 6 depicts an illustrative method for digital token utilization in accordance with one or more example embodiments described herein. In step 601, a computing platform configured to operate in a decentralized P2P network and including one or more processors and memory storing at least a portion of a blockchain of the decentralized P2P network may register, to the blockchain of the decentralized P2P network, a collection smart contract configured to facilitate collecting and returning of digital tokens of a particular type. In step 603, the computing platform may send the digital tokens from a digital token wallet associated with a second computing device to the collection smart contract. In step 603, the computing platform may send the digital tokens with an amount of appreciation value from the collection smart contract to the digital token wallet associated with the second computing device. In step 607, the computing platform may register, to the blockchain of the decentralized P2P network, a distribution smart contract configured to facilitate distributing and recollecting the digital tokens. In step 609, the computing platform may send other types of tokens from wallets associated with a third computing device to the distribution smart contract, and may send a corresponding amount of the digital tokens from the distribution smart contract to a digital token wallet associated with the third computing device. In step 611, the computing platform may determine whether the third computing device has returned the digital tokens with an additional amount of the digital tokens representing interest within a time threshold. If the computing platform determines that the third computing device has returned the digital tokens with the additional amount of the digital tokens representing the interest within the time threshold, then the computing platform may in step 615 return the other types of tokens from the distribution smart contract to the wallets associated with the third computing device. If the computing platform determines that the third computing device has not returned the digital tokens with the additional amount of the digital tokens representing the interest within the time threshold, then the computing platform may in step 613 forfeit the other types of tokens in the distribution smart contract.

The example embodiments discussed herein may be used for depositing and lending of digital tokens. Lenders may deposit their digital tokens to the example systems discussed herein, and borrowers may borrow the digital tokens. Service provider tokens may be used to facilitate the depositing of the digital tokens, and the credit tokens may be used to facilitate the lending of the digital tokens. Using the service provider tokens and the credit tokens, the depositing and lending processes may be simplified. Additionally, the example systems discussed herein may provide a secure environment for depositing and lending tokens. As centralized computing systems may create a single point of failure, the decentralized P2P network may facilitate depositing and lending tokens with enhanced security.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system, comprising:
  a data storage device storing at least a portion of a blockchain of a decentralized person to person (P2P) network;
  a computing device comprising:
    one or more processors; and
    memory storing computer readable instructions that, when executed by the one or more processors, cause the computing device to:
      register, based on a first registration request from a first user computing device, a collection smart contract by adding a first new block to the blockchain, wherein the first new block comprises the collection smart contract;
      receive, from the first user computing device, a digital signature associated with the first computing device;
      receive, from the first user computing device, a first event message comprising information corresponding to a first plurality of digital tokens, a smart contract identifier, and a first device identifier associated with the first user computing device;
      authenticate the first event message based on the digital signature associated with the first computing device;
      execute, based on authentication of the first event message, the collection smart contract by causing transfer, by a service provider token holder to the collection smart contract, a first amount of service provider tokens, wherein the service provider tokens are issued by the computing device to facilitate depositing and withdrawing of the digital tokens;
      issue, by the computing device, the first amount of service provider tokens, wherein the service provider tokens are backed by physical objects of value;
      receive, from a second user computing device, a second event message comprising information corresponding to a second plurality of digital tokens, the smart contract identifier, and a second device identifier associated with the second user computing device;
      authenticate the second event message based on the second device identifier; and
      execute the collection smart contract based on an authentication of the second event message, by causing transfer from a digital token holder associated with the second user computing device and to the collection smart contract, a first amount of the second plurality of digital tokens;
      transfer, from the collection smart contract to a service provider token holder associated with the second user computing device, a second amount of the service provider tokens based on a token exchange rate;
      generate, based on a return of the first amount of the second plurality of digital tokens, a quantity of credit tokens corresponding to an indication of an increasing creditworthiness of the second user computing device;
      receive, from the first user computing device, a second registration request for registering a distribution smart contract;
      register the distribution smart contract to the blockchain as a second new block associated with the distribution smart contract;
      execute, based on an authenticated fourth event message, the distribution smart contract, by causing transfer a third amount of digital tokens from a digital token holder associated with the first user computing device and to a memory associated with the distribution smart contract;
      receive, from a third user computing device, a fifth event message indicating a first amount of the credit tokens and an identifier of the distribution smart contract, wherein the first amount of the credit tokens corresponds to a credit score associated with the third user computing device; and
      based on an authenticated fifth event message received from the third user computing device:
        transfer, from a credit token holder associated with the third user computing device and to the memory associated with the distribution smart contract, a first amount of the credit tokens;
        determine, based on the first amount of the credit tokens and an exchange rate between the digital tokens and the credit tokens, a fourth amount of the digital tokens; and
        transfer, based on the first amount of the credit tokens and a credit token exchange rate, a fourth amount of the digital tokens from the distribution smart contract and to a digital token holder associated with the third user computing device.

2. The system of claim 1, wherein the computer readable instructions, when executed by the one or more processors, further cause the computing device to:
  receive, from the second user computing device, a third event message comprising an identifier of the collection smart contract; and
  transfer, based on validation of the third event message and from the service provider token holder associated with the second user computing device to the collection smart contract, a third amount of the service provider tokens;
  determine, based on a digital token appreciation rate and a duration between receiving the second event message and receiving the third event message, an updated digital token exchange rate;
  transfer, from the collection smart contract and to the digital token holder associated with the second user computing device, a second amount of the digital tokens corresponding to the third amount of the service provider tokens and the updated digital token exchange rate.

3. The system of claim 1, wherein the computer readable instructions, when executed by the one or more processors, further cause the computing device to:

based on an authenticated sixth event message received from the third user computing device:
  transfer, based on an interest rate associated with the digital tokens, a fifth amount of the digital tokens from the digital token holder associated with the third user computing device and to the memory associated with distribution smart contract.

4. The system of claim 3, wherein the computer readable instructions, when executed by the one or more processors, further cause the computing device to:
  based on a determination that the fifth amount of the digital tokens does not correspond to an expected amount of the digital tokens, transfer, from the distribution smart contract and to a memory associated with a credit token holder associated with the first user computing device, the first amount of the credit tokens.

5. The system of claim 1, wherein the computer readable instructions, when executed by the one or more processors, further cause the computing device to:
  transfer, from the collection smart contract and to the distribution smart contract, a portion of the first amount of the digital tokens based on an authentication of the second event message.

6. The system of claim 1, wherein the computer readable instructions, when executed by the one or more processors, further cause the computing device to:
  determine, based on a change to the credit score associated with the third user computing device, a second amount of the credit tokens; and
  assign the second amount of the credit tokens to the credit token holder associated with the third user computing device.

7. A method for managing, in a decentralized peer-to-peer (P2P) network, a blockchain of the decentralized P2P network:
  registering, by a service provider computing device and based on a first registration request from a first user computing device, a collection smart contract by adding a first new block to the blockchain, wherein the first new block comprises the collection smart contract;
  authenticating a first event message based on a digital signature associated with the first user computing device, wherein the first event message is received from the first user computing device and comprises an indication of a first amount of service provider tokens, wherein the service provider tokens are issued by the service provider computing device to facilitate depositing and withdrawing of digital tokens;
  transferring, from a service provider token holder associated with the first user computing device and to a memory associated with the collection smart contract, the first amount of the service provider tokens;
  authenticating a second event message received from a second user computing device based on a second digital signature associated with the second user computing device;
  based on the second event message:
    transferring, from a digital token holder associated with the second user computing device and to the memory associated with the collection smart contract, a first amount of the digital tokens;
    transferring, based on a digital token exchange rate and from the memory associated with the collection smart contract and to a service provider token holder associated with the second user computing device, a second amount of the service provider tokens; and
  registering, based on a second registration request received from the first user computing device, a distribution smart contract by adding a second new block to the blockchain, wherein the second new block comprises the distribution smart contract;
  transferring, based on a fourth event message received from the first user computing device, a third amount of digital tokens from a digital token holder associated with the first user computing device and to a memory associated with the distribution smart contract;
  transferring, based on a fifth event message received from a third user computing device, a first amount of credit tokens from a credit token holder associated with the third user computing device and to the memory associated with the distribution smart contract, the first amount of the credit tokens; and
  transferring, based on a digital token exchange rate, a fourth amount of digital tokens from the memory associated with the distribution smart contract and to a digital token holder associated with the third user computing device.

8. The method of claim 7, further comprising:
based on a third event message received from the second user computing device:
  transferring, from the service provider token holder associated with the second user computing device and to the memory associated with the collection smart contract, a third amount of the service provider tokens;
  determining an updated exchange rate between the digital tokens and the service provider tokens; and
  transferring, based on the updated exchange rate and from the memory associated with the collection smart contract and to the digital token holder associated with the second user computing device, a second amount of the digital tokens.

9. The method of claim 7, further comprising:
based on a sixth event message received from the third user computing device:
  transferring, based on a digital token interest rate and a duration between receipt of the fifth event message and the sixth event message, at least an additional amount of credit tokens from the memory associated with the distribution smart contract and to the credit token holder associated with the third user computing device; and
  transferring, from the digital token holder associated with the third user computing device and to the memory associated with the distribution smart contract, a fifth amount of the digital tokens corresponding to the digital token interest rate.

10. The method of claim 9, further comprising:
transferring, based on a determination that the fifth amount of the digital tokens does not correspond to an expected amount of the digital tokens, the first amount of the credit tokens from the memory associated with the distribution smart contract to a credit token holder associated with the first user computing device.

11. The method of claim 7, further comprising:
transferring, based on the second event message, a portion of the first amount of the digital tokens from the memory associated with the collection smart contract and to the distribution smart contract.

12. The method of claim 7, further comprising:
- determining, based on a credit score associated with the third user computing device, a second amount of the credit tokens; and
- assigning the second amount of the credit tokens to the credit token holder associated with the third user computing device.

13. One or more non-transitory computer readable media storing instructions that, when executed by a computing platform configured to operate in a decentralized peer-to-peer (P2P) network, the computing platform including one or more processors and memory storing at least a portion of a blockchain of the decentralized P2P network, cause the computing platform to:
- register, based on a first registration request from a first user computing device, a collection smart contract by adding a first new block to the blockchain, wherein the first new block comprises the collection smart contract;
- authenticate a first event message based on a digital signature associated with the first user computing device, wherein the first event message is received from the first user computing device and comprises an indication of a first amount of service provider tokens, wherein the service provider tokens are issued by the computing platform comprising a service provider computing device to facilitate depositing and withdrawing of digital tokens;
- transfer, from a service provider token holder associated with the first user computing device and to a memory associated with the collection smart contract, the first amount of the service provider tokens;
- authenticate a second event message received from a second user computing device based on a second digital signature associated with the second user computing device; and
- based on the second event message:
  - transfer, from a digital token holder associated with the second user computing device and to the memory associated with the collection smart contract, a first amount of the digital tokens; and
  - transfer, based on a digital token exchange rate and from the memory associated with the collection smart contract and to a service provider token holder associated with the second user computing device, a second amount of the service provider tokens; and
- register, based on a second registration request received from the first user computing device, a distribution smart contract by adding a second new block to the blockchain, wherein the second new block comprises the distribution smart contract;
- transfer, based on a fourth event message received from the first user computing device, a third amount of digital tokens from a digital token holder associated with the first user computing device and to a memory associated with the distribution smart contract;
- transfer, based on a fifth event message received from a third user computing device, a first amount of credit tokens from a credit token holder associated with the third user computing device and to the memory associated with the distribution smart contract, the first amount of the credit tokens; and
- transfer, based on a digital token exchange rate, a fourth amount of digital tokens from the memory associated with the distribution smart contract and to a digital token holder associated with the third user computing device.

14. The one or more non-transitory computer readable media of claim 13, wherein the instructions, when executed by the computing platform, further cause the computing platform to:
- based on a third event message received from the second user computing device:
  - transfer, from the service provider token holder associated with the second user computing device and to the memory associated with the collection smart contract, a third amount of the service provider tokens;
  - determine an updated exchange rate between the digital tokens and the service provider tokens; and
  - transfer, based on the updated exchange rate and from the memory associated with the collection smart contract and to the digital token holder associated with the second user computing device, a second amount of the digital tokens.

15. The one or more non-transitory computer readable media of claim 13, wherein the instructions, when executed by the computing platform, further cause the computing platform to:
- based on a sixth event message received from the third user computing device:
  - transfer, based on a digital token interest rate and a duration between receipt of the fifth event message and the sixth event message, at least an additional amount of credit tokens from the memory associated with the distribution smart contract and to the credit token holder associated with the third user computing device; and
  - transfer, from the digital token holder associated with the third user computing device and to the memory associated with the distribution smart contract, a fifth amount of the digital tokens corresponding to the digital token interest rate.

16. The one or more non-transitory computer readable media of claim 15, wherein the instructions, when executed by the computing platform, further cause the computing platform to:
- transfer, based on a determination that the fifth amount of the digital tokens does not correspond to an expected amount of the digital tokens, the first amount of the credit tokens from the memory associated with the distribution smart contract to a credit token holder associated with the first user computing device.

17. The one or more non-transitory computer readable media of claim 13, wherein the instructions, when executed by the computing platform, further cause the computing platform to:
- determine, based on a credit score associated with the third user computing device, a second amount of the credit tokens; and
- assign the second amount of the credit tokens to the credit token holder associated with the third user computing device.

* * * * *